US012783911B2

(12) United States Patent
Nguyen et al.

(10) Patent No.: US 12,783,911 B2
(45) Date of Patent: Nov. 3, 2026

(54) ARTIFICIAL INTELLIGENCE BASED FAULT DETECTION FOR INDUSTRIAL SYSTEMS

(71) Applicant: Aitomatic, Inc., Cupertino, CA (US)

(72) Inventors: Christopher Nguyen, Los Altos, CA (US); Nhan Lam Chi Vu, San Jose, CA (US); Taejin Chun, San Jose, CA (US); The Vinh Luong, San Jose, CA (US); Timothy Michael Gerard Rozario, Milpitas, CA (US); Hong An Phan, San Jose, CA (US); Anh Hai Ha, Sunnyvale, CA (US); Roshan Devan Nanu, Waltham, MA (US); Tri Cao Le, Ho Chi Minh City (VN)

(73) Assignee: Aitomatic, Inc., Cupertino, CA (US)

( * ) Notice: Subject to any disclaimer, the term of this patent is extended or adjusted under 35 U.S.C. 154(b) by 672 days.

(21) Appl. No.: 18/194,549

(22) Filed: Mar. 31, 2023

(65) Prior Publication Data

US 2023/0316105 A1 Oct. 5, 2023

Related U.S. Application Data

(60) Provisional application No. 63/425,578, filed on Nov. 15, 2022, provisional application No. 63/326,767, filed on Apr. 1, 2022.

(51) Int. Cl.
*G06F 16/00* (2019.01)
*G06N 5/022* (2023.01)
(Continued)

(52) U.S. Cl.
CPC ............ *G06N 5/022* (2013.01); *G06N 5/025* (2013.01); *G06N 20/20* (2019.01)

(58) Field of Classification Search
CPC ........ G06N 5/022; G06N 5/025; G06N 20/20; G06N 3/0455; G06N 20/00
See application file for complete search history.

(56) References Cited

U.S. PATENT DOCUMENTS 6,430,615 B1 * 8/2002 Hellerstein ......... H04L 67/1029 709/224
6,456,993 B1 9/2002 Freund
(Continued)

OTHER PUBLICATIONS

Carnegie Mellon University, “Building AI Better: SEI Introduces Three Pillars of AI Engineering,” Software Engineering Institute, Jun. 30, 2021, Retrieved from the internet <URL: https://insights.sei.cmu.edu/news/building-ai-better-sei-introduces-three-pillars-of-ai-engineering/#:~:text=The%20SEI%20envisions%20AI%20engineering,deliver%20on%20their%20intended%20purpose.>.
(Continued)

*Primary Examiner* — Noosha Arjomandi
(74) *Attorney, Agent, or Firm* — Fenwick & West LLP

(57) ABSTRACT

A system makes predictions using a machine learning model combined with a knowledge model. The system provides input data to a knowledge model and a machine learning based model. The machine learning based model is trained to make predictions based on input data. The system provides the outputs of the machine learning based model and the knowledge model to an ensemble model configured to combine results of the knowledge model and the machine learning based model. The system can be used for several applications. For example, the system may classify an input text based on a hierarchy of categories. The system may perform fault detection in time series data by identifying an anomaly data point and predicting whether the anomaly data point is a fault.

20 Claims, 26 Drawing Sheets

(51) Int. Cl.

| | |
|---|---|
| ***G06N 5/025*** | (2023.01) |
| ***G06N 20/20*** | (2019.01) |

(56) References Cited

U.S. PATENT DOCUMENTS

| | | | | |
|---|---|---|---|---|
| 11,250,723 | B1 | 2/2022 | Bayahya et al. | |
| 11,341,367 | B1 | 5/2022 | Barbosa et al. | |
| 11,374,953 | B2 * | 6/2022 | Givental | G06F 16/55 |
| 11,646,014 | B1 * | 5/2023 | Harsola | G10L 15/16 |
| | | | | 704/232 |
| 12,061,961 | B2 * | 8/2024 | Fuerst | G06N 3/09 |
| 2012/0053946 | A1 | 3/2012 | Bellegarda | |
| 2012/0304008 | A1 | 11/2012 | Hackstein et al. | |
| 2015/0128263 | A1 * | 5/2015 | Raugas | G06F 21/552 |
| | | | | 726/23 |
| 2015/0161636 | A1 | 6/2015 | Williams et al. | |
| 2017/0031329 | A1 | 2/2017 | Inagaki et al. | |
| 2017/0235848 | A1 | 8/2017 | Van et al. | |
| 2017/0276571 | A1 * | 9/2017 | Vitullo | G06Q 10/06 |
| 2018/0314984 | A1 | 11/2018 | Wiener et al. | |
| 2020/0034733 | A1 * | 1/2020 | Pang | G06F 16/2477 |
| 2020/0042903 | A1 | 2/2020 | Moazzami et al. | |
| 2020/0116522 | A1 * | 4/2020 | Paul | G01D 3/08 |
| 2020/0160191 | A1 | 5/2020 | Brisimi et al. | |
| 2020/0306959 | A1 | 10/2020 | Huang et al. | |
| 2020/0382527 | A1 | 12/2020 | Mitelman et al. | |
| 2021/0035011 | A1 * | 2/2021 | Arnold | G06F 11/0709 |
| 2021/0073060 | A1 * | 3/2021 | Grant | G06F 11/3006 |
| 2021/0125104 | A1 | 4/2021 | Christiansen et al. | |
| 2021/0209486 | A1 * | 7/2021 | Fan | G06N 20/20 |
| 2021/0248498 | A1 * | 8/2021 | Pang | G06F 18/214 |
| 2021/0279606 | A1 * | 9/2021 | Srinivasan | G06N 3/091 |
| 2021/0344695 | A1 * | 11/2021 | Palani | G06F 16/285 |
| 2021/0389978 | A1 | 12/2021 | Cleere et al. | |
| 2022/0253699 | A1 * | 8/2022 | Hoshen | G06N 3/09 |
| 2023/0120896 | A1 * | 4/2023 | Bhattacharyya | G06F 16/2365 |
| | | | | 707/690 |
| 2023/0316105 | A1 * | 10/2023 | Nguyen | G06N 20/00 |
| | | | | 706/46 |
| 2025/0363359 | A1 * | 11/2025 | Galvin | G06N 3/045 |

OTHER PUBLICATIONS

Chui, M. et al. "AI Adoption Advances, but Foundational Barriers Remain," McKinsey, Nov. 13, 2018, Retrieved from the internet <URL: https://www.mckinsey.com/featured-insights/artificial-intelligence/ai-adoption-advances-but-foundational-barriers-remain>.

Fujimaki, R. "The 6 Challenges of Implementing AI in Manufacturing," American Machinist, Dec. 2, 2020, Retrieved from the internet <URL: https://www.americanmachinist.com/enterprise-data/article/21149328/the-6-challenges-of-implementing-ai-in-manufacturing-dotdata>.

Hambro, E. et al. "The NetHack Challenge: Dungeons, Dragons, and Tourists," Conference on Neural Information Processing Systems, NeurIPS 2021 Report, Dec. 2021, Retrieved from the internet <URL: https://nethackchallenge.com/report.html>.

National Institute of Standards and Technology, "AI Risk Management Framework," Jul. 29, 2021, Retrieved from the internet <URL: https://www.nist.gov/itl/ai-risk-management-framework>.

National Institute of Standards and Technology, "Technical AI Standards," Aug. 3, 2021, Retrieved from the internet <URL: https://www.nist.gov/artificial-intelligence/technical-ai-standards>.

Sculley, D. et al. "Machine Learning: The High Interest Credit Card of Technical Debt," Conference on Neural Information Processing Systems, SE4ML: Software Engineering for Machine Learning, Dec. 2014, pp. 1-9.

Shnayder, V. et al. "7 Challenges of Building Industrial AI Applications," Bonsai, Medium, Oct. 5, 2017, Retrieved from the internet <URL: https://medium.com/@BonsaiAI/7-challenges-of-building-industrial-ai-applications-445ed321cad8>.

Stanford Hai, "Summary of AI Provisions from the National Defense Authorization Act 2021," Jan. 1, 2021, Retrieved from the internet <URL: https://hai.stanford.edu/summary-ai-provisions-national-defense-authorization-act-2021>.

The American Society of Mechanical Engineers, "National Artificial Intelligence Initiative Becomes Law in FY2021 Ndaa," Jan. 11, 2021, Retrieved from the internet <URL: https://www.asme.org/government-relations/capitol-update/national-artificial-intelligence-initiative-becomes-law-in-fy2021-ndaa>.

United States Office Action, U.S. Appl. No. 18/194,564, Nov. 19, 2025, 25 pages.

United States Office Action, U.S. Appl. No. 18/194,559, Dec. 5, 2025, 14 pages.

* cited by examiner

ARTIFICIAL INTELLIGENCE BASED FAULT DETECTION FOR INDUSTRIAL SYSTEMS

CROSS REFERENCE TO RELATED APPLICATION

This application claims priority to U.S. Provisional Patent Application Ser. No. 63/326,767, entitled “KNOWLEDGE BASED ARTIFICIAL INTELLIGENCE ARCHITECTURE FOR INDUSTRIAL SYSTEMS,” filed Apr. 1, 2022, and also claims priority to U.S. Provisional Patent Application Ser. No. 63/425,578, entitled “TRANSLATING FROM NATURAL LANGUAGE TO DOMAIN SPECIFIC LANGUAGE FOR REPRESENTING EXPERT KNOWLEDGE,” filed Nov. 15, 2022, each of which is incorporated by reference in its entirety.

FIELD OF INVENTION

The disclosure relates in general to artificial intelligence and machine learning techniques, and more specifically to use of machine learning based models combined with knowledge models for accurate predictions.

BACKGROUND

Artificial intelligence (AI) techniques are useful for several industrial systems. For example, machine learning based models are used for making predictions used in industrial processes. There are several challenges in developing artificial intelligence techniques for industrial systems. For example, training of machine learning models such as neural networks requires training data set that handles various situations including failure cases. However, industrial systems are often designed to avoid failures. As a result, it is difficult to obtain a complete training data set for training such models. Machine learning models that are training using incomplete training datasets are likely to fail in practice. For example, if a rare failure situation is encountered by the system, the machine learning model is unlikely to be trained to handle the situation and very likely to make inaccurate predictions leading to further failure of the systems.

SUMMARY

A system makes predictions using a machine learning model combined with a knowledge model. The system receives a request for making a prediction based on input data. The system provides the input data to a knowledge model. The knowledge model is a rule-based model. The system provides the input data to a machine learning based model. The machine learning based model is trained to make predictions based on input data. The system executes the knowledge model to generate a first output representing a first prediction for the input data. The system further executes the machine learning based model to generate a second output representing a second prediction for the input data. The system provides the first output and the second output to an ensemble model configured to combine results of the knowledge model and the machine learning based model. The system executes the ensemble model to determine a final output based on a combination of the first output and the second output. The system provides the final output as the prediction based on the input data.

According to an embodiment, the ensemble model selects the category of the input text based on a measure of accuracy of the machine learning model and the knowledge model. For example, if the accuracy of the machine learning model is below a threshold, the ensemble model uses the output of the knowledge model as the final output.

If the system uses the output of the knowledge model as the final output, the system uses the input data and the output of the knowledge model as training data for the machine learning model. The system may generate synthetic data based on the input data and the output of the knowledge model as additional training data for the machine learning model.

A system performs fault detection using a machine learning model and a knowledge model. The system receives time series data including a sequence of data points. The system identifies a data point (referred to as the anomaly data point) of the time series data that represents an anomaly. The system provides information describing the anomaly data point to a knowledge model. The knowledge model is a rule-based model. The system further provides information describing the anomaly data point to a machine learning based model. The system executes the knowledge model to generate a first output indicating whether the data point represents a fault. The system executes the machine learning based model to generate a second output indicating whether the data point represents a fault. The system provides the first output and the second output to an ensemble model. The ensemble model is configured to combine results of the knowledge model and the machine learning based model. The system executes the ensemble model to determine a final output based on a combination of the first output and the second output. The final output indicates whether the anomaly data point represents a fault. The system provides the final output to a requestor, for example, a client device.

According to an embodiment, the ensemble model selects the final output based on a measure of accuracy of the machine learning model and the knowledge model. For example, if the accuracy of the machine learning model is below a threshold, the ensemble model uses the first output by the knowledge model as the final output.

If the system uses the first output of the knowledge model as the final output, the system uses the input data and the first output of the knowledge model as training data for the machine learning model. The system may generate synthetic data based on the category determined by the knowledge model as the input data and the first output of the knowledge model as additional training data for the machine learning model.

A system performs classified text inputs using a machine learning model combined with a knowledge model. The system receives an input text for classification based on a hierarchy of categories. The system provides the input text to a knowledge model. The knowledge model is a rule-based model comprising rules for classifying text. The system provides the input text to a machine learning based model is trained to classify text. The system executes the knowledge model to generate a first output representing a first category for the input text. The system executes the machine learning based model to generate a second output representing a second category for the input text. The system provides the first output and the second output to an ensemble model configured to combine results of the knowledge model and the machine learning based model. The ensemble model is executed to determine a category for the input text based on the first category and the second category. The system sends the category for the input text determined by the ensemble model to a client device.

According to an embodiment, the ensemble model selects the category of the input text based on a measure of accuracy of the machine learning model and the knowledge model. For example, if the accuracy of the machine learning model is below a threshold, the ensemble model uses the category determined by the knowledge model as the category of the input text.

If the system uses the category determined by the knowledge model as the category of the input text, the system uses the input text as training data for the machine learning model. The system may generate synthetic data based on the category determined by the knowledge model as the category of the input text as additional training data for the machine learning model.

Embodiments perform steps of the methods disclosed hereon. Embodiments include computer readable storage media storing instructions for performing the steps of the above method. Embodiments include computer systems that comprise one or more computer processors and a computer readable storage medium store instructions for performing the steps of the above method.

The features and advantages described in this summary and the following detailed description are not all-inclusive. Many additional features and advantages will be apparent to one of ordinary skill in the art in view of the drawings, specification, and claims hereof.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure 1:
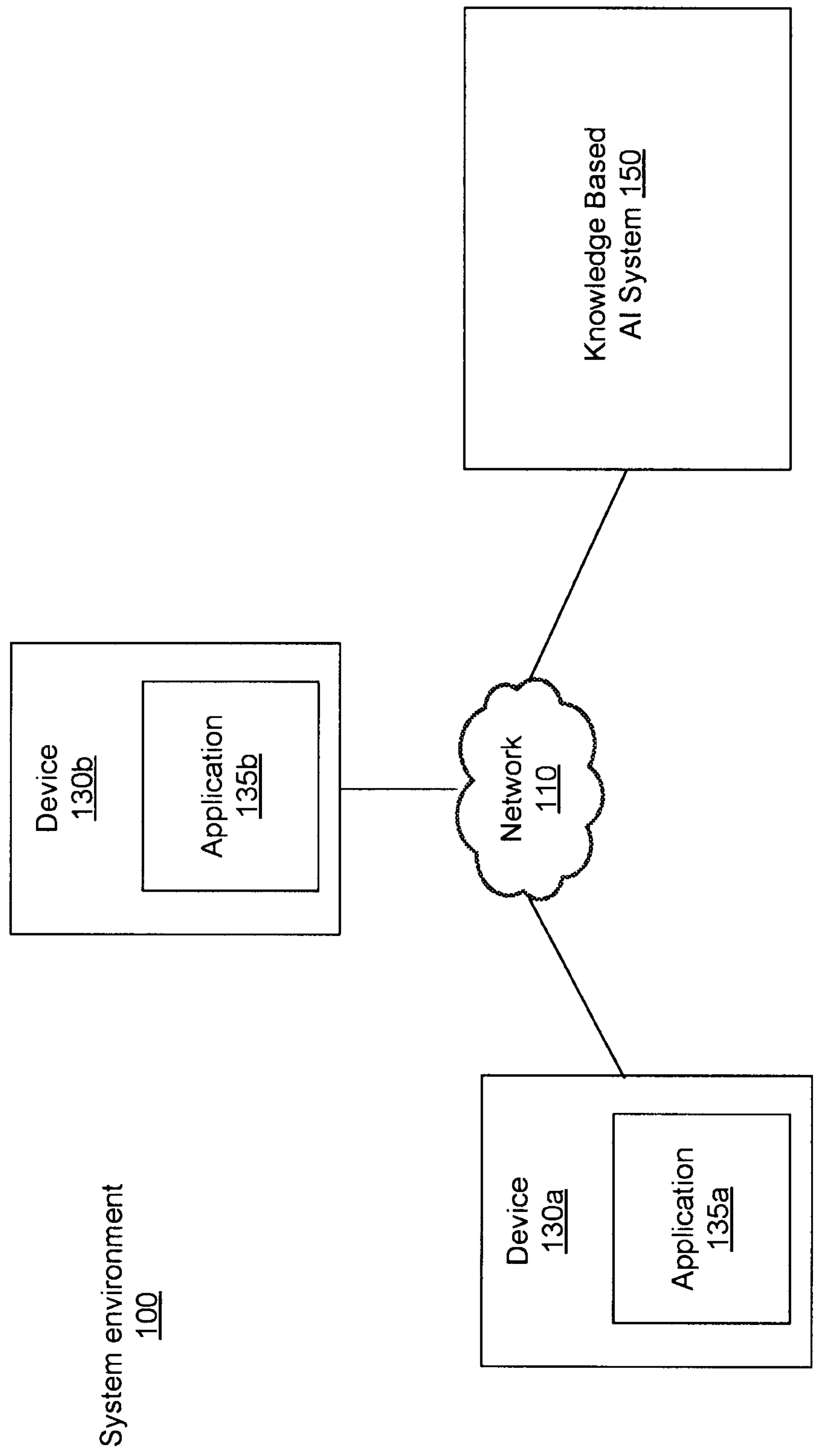
FIG. 1 shows the overall system environment for extracting salient features associated with sequences, in accordance with an embodiment of the invention.

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

A system according to an embodiment, implements a knowledge-first architecture that allows knowledge of an expert, for example, a domain expert to be incorporated into the development and use of an AI system. The system is referred to as a knowledge based AI system or as a knowledge first system. An AI system includes one or more predictive nodes, each node representing a computational system that receives input data and makes one or more predictions that may be used for system functions. For example, the input data may be sensor data generated by an industrial system and the prediction may indicate whether there is a fault in the industrial system.

According to an embodiment, the knowledge based AI system comprises a predictive unit that uses a knowledge model both to provide training labels for a generalized ML model and to provide predictive output for a functional system even in absence of a well trained ML model. The system also contains an ensemble model which aggregates the outputs of both the expert-made knowledge model and the generalized (ML) model and outputs a final decision. This ensemble model can combine these outputs in a number of ways. According to an embodiment, the ensemble model combines the outputs using a logical AND or OR between the prior model outputs. According to other embodiments, the ensemble model inspects the model accuracy of the ML model and prioritizes the knowledge model output if ML model accuracy is low. According to an embodiment, the ensemble model is implemented as an ML model, learning to optimally use both ML and knowledge outputs to generate a final decision for system operation.

The knowledge model can also have many forms and be adapted to suit many use-cases. The simplest implementations are logical operations on the input data to either output a boolean classification or more detailed categorical labels. In the case of predictive maintenance and fault prediction use cases, unsupervised anomaly detection is done on the input dataset before passing the data for anomaly points on to the Oracle. In this case the knowledge model incorporates the expertise of someone with years of experience in maintaining the system in question. The expert users specify rules related to the original sensor variables such as 'If sensor A>threshold A and sensor B<threshold B then output error C'. In this way a knowledge model classifies the anomalous data point as a specific type of error. Early on, this aids in system operation, but as data is accumulated and labelled by the knowledge model, the associated ML model becomes more accurate and functional until both models contribute valuable output and the ensemble model utilizes insight from both to draw a final conclusion.

When applying AI to physical industrial use-cases, there is often a lack of the necessary raw data for adequately training the required machine learning algorithms. Furthermore, there are special considerations or regulations that must be taken into account in order to properly serve the use-case. As such, these systems often require the integration of human domain expertise into the system in order to improve machine-learning training efficacy, improve system trustability or adherence of the system to the strict requirements and regulations in industrial applications. The difficulties in this process for data scientists and AI engineers are (A) communicating with domain experts and extracting their knowledge for use in AI systems, and (B) combining that extracted knowledge with ML to produce working models.

The system implements a knowledge translator (referred to as a K-Translator) that helps AI engineers develop AI models which combine machine-learning and human knowledge. The K-Translator is a tool that uses natural language processing to extract useful domain knowledge from conversational text and translate that knowledge into a form that can then be used to build both logical and K1st models in a semi-automated fashion. This form is a knowledge language, a domain-specific language (DSL) for capturing, storing and managing expert knowledge. The knowledge language may also be referred to herein as a rules language. Some embodiments may use a suite of domain specific languages to support different types of knowledge (e.g., for different domains) and or models. Once in this structured format, users (data scientists and AI engineers) are able to edit, curate and refine the extracted knowledge bits, and work with the K-Translator application in order to form directed questions for domain experts in order to fill in missing pieces of knowledge. This improves the efficiency of the process of knowledge extraction by saving a huge amount of time in parsing and extracting knowledge. The system further helps the AI engineer better understand and communicate with the domain experts.

System Environment

FIG. 1 shows the overall system environment for a knowledge based artificial intelligence system, in accordance with an embodiment of the invention. The overall system environment includes one or more devices 130, a knowledge based artificial intelligence system 150, and a network 150. Other embodiments can use more or less or different systems than those illustrated in FIG. 1. Functions of various modules and systems described herein can be implemented by other modules and/or systems than those described herein.

FIG. 1 and the other figures use like reference numerals to identify like elements. A letter after a reference numeral, such as "130*a*," indicates that the text refers specifically to the element having that particular reference numeral. A reference numeral in the text without a following letter, such as "130," refers to any or all of the elements in the figures bearing that reference numeral (e.g., "130" in the text refers to reference numerals "130" and/or "130" in the figures).

Figure 2:
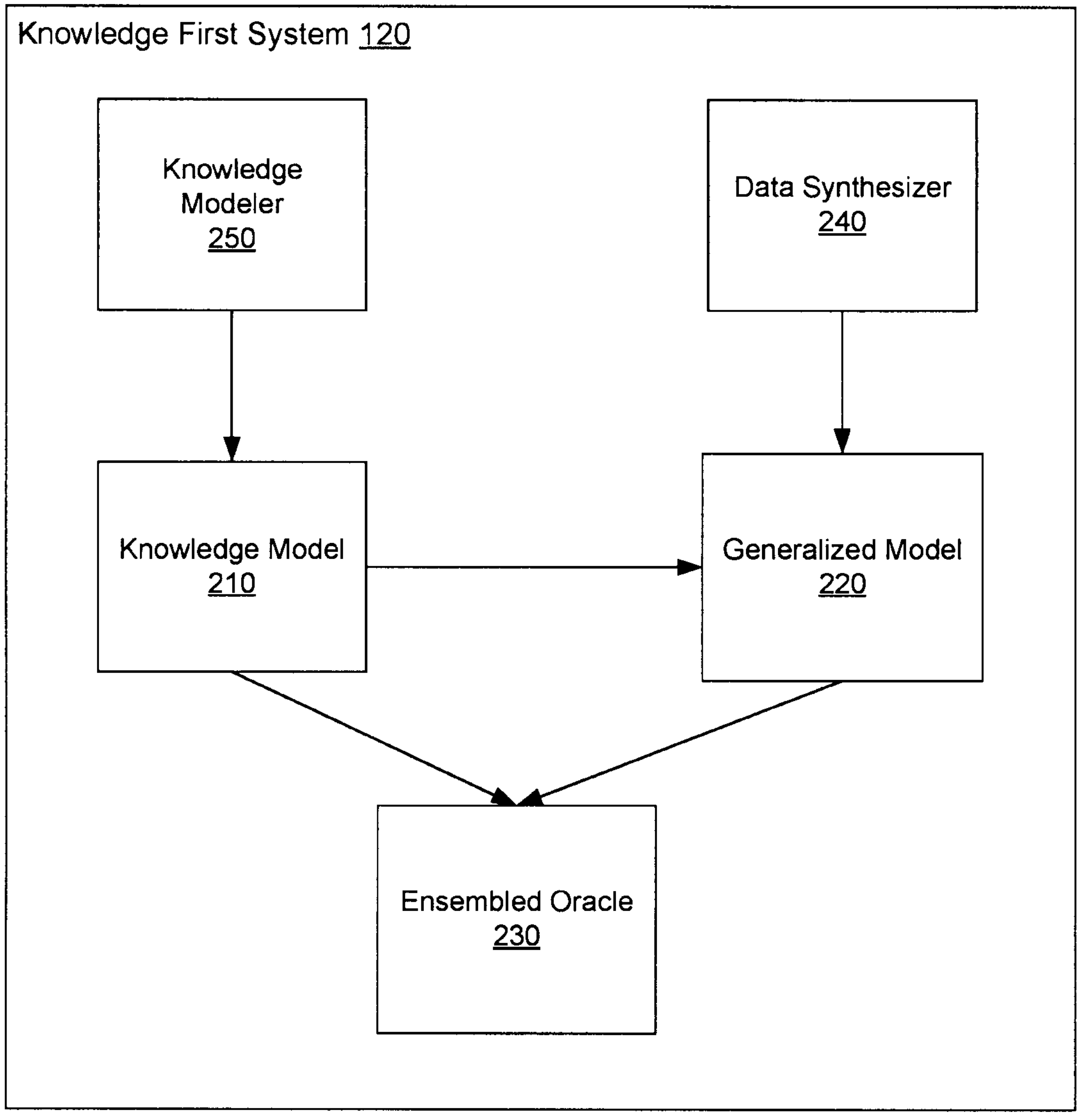
FIG. 2 shows the system architecture of a knowledge first system, in accordance with an embodiment.

The knowledge based artificial intelligence system 150 allows experts to configure rules for making predictions related to a system. The knowledge based artificial intelligence system 150 further generates models, for example, machine learning models for making predictions. The knowledge based artificial intelligence system 150 combines results of the rule based system and machine learning base system to make predictions. Further details of the knowledge based artificial intelligence system 150 are illustrated in FIG. 2 and described in connection with FIG. 2.

A device can be any physical device, for example, a device connected to other devices or systems via Internet of things (IoT). The IoT represents a network of physical devices, vehicles, home appliances and other items embedded with electronics, software, sensors, actuators, and connectivity which enables these objects to connect and exchange data. A device can be a sensor that sends sequence of data sensed over time. The sequence of data received from a device may represent data that was generated by the device, for example, sensor data or data that is obtained by further processing of the data generated by the device. Further processing of data generated by a device may include scaling the data, applying a function to the data, or determining a moving aggregate value based on a plurality of values generated by the device, for example, a moving average.

In an embodiment, the devices 130 are client devices used by users to interact with the computer system 150. The users of the devices 130 include experts that configure the knowledge based artificial intelligence system 150. In an embodiment, the device 130 executes an application 135 that allows users to interact with the knowledge based artificial intelligence system 150. For example, the application 135 executing on the device 130 may be an internet browser that interacts with web servers executing on knowledge based artificial intelligence system 150.

Systems and applications shown in FIG. 1 can be executed using computing devices. A computing device can be a conventional computer system executing, for example, a Microsoft™ Windows™-compatible operating system (OS), Apple™ OS X, and/or a Linux distribution. A computing device can also be a client device having computer functionality, such as a personal digital assistant (PDA), mobile telephone, video game system, etc.

The interactions between the devices 130 and the knowledge based artificial intelligence system 150 are typically performed via a network 150, for example, via the internet. In one embodiment, the network uses standard communications technologies and/or protocols. In another embodiment, the various entities interacting with each other, for example, the knowledge based artificial intelligence system 150 and the devices 130 can use custom and/or dedicated data communications technologies instead of, or in addition to, the ones described above. Depending upon the embodiment, the network can also include links to other networks such as the Internet.

System Architecture

FIG. 2 shows the system architecture of a knowledge first system, in accordance with an embodiment. The knowledge first system 120 comprises a knowledge model 210, a generalized model 220, an ensembled oracle 230, a data synthesizer 240, and a knowledge modeler 250. In other embodiments, the deep learning module 120 may include more of fewer modules than those shown in FIG. 2. Furthermore, specific functionality may be implemented by modules other than those described herein. In some embodiments, various components illustrated in FIG. 2 may be executed by different computer systems 150. For example, the ensembled oracle 230 may be executed by one or more processors different from the processors that execute the knowledge model 210 and the generalized model 220. Furthermore, the various models of the knowledge first system 120 may be executed using a parallel or distributed architecture for faster execution.

The knowledge model 210 stores rules based on domain expertise. In an embodiment, the knowledge model 210 is a rule-based system. The rules may be provided by a domain expert. The rules may incorporate thresholds specified by experts that may be used to predict values or take actions. For example, if certain input is above a predetermined threshold value, certain action should be performed.

The generalized model 220 is a trained machine learning based model that makes predictions based on input data. The generalized model 220 may be incrementally trained as new training data is available. Accordingly, the generalized model 220 is evolving. For example, the generalized model 220 may be initialized using parameters that are obtained from a machine learning model trained using small training dataset. Periodically the generalized model 220 is trained using larger and better training dataset. Accordingly, the parameters of the generalized model 220 are updated using better trained models.

Each of the knowledge model 210 and the generalized model 220 makes a prediction and also outputs a measure of accuracy (or confidence score) associated with the predicted output. The measure of accuracy of each model is used to determine how the final output is determined based on the outputs of each of the models, i.e., the knowledge model 210 and the generalized model 220. The accuracy of the generalized model 220 may be determined during a model evaluation phase and provided with the model, for example, as a function (or set of instructions) that calculates the model accuracy. In an embodiment, the knowledge model 210 uses boolean rules, for example, rules specified as if-then-else statements that compare input data with thresholds to determine the result. In another embodiment, the knowledge model 210 uses fuzzy logic that has multi-valued variable (compared to boolean variables that can take only two values). For example, the knowledge model 210 may receive some data and determine statistics describing the data to generate fuzzy logic.

The ensembled oracle 230 determines whether to use the prediction of the generalized model 220 or to use the prediction based on knowledge model 210. Accordingly, if the ensembled oracle 230 determines that the prediction of the generalized model 220 is less accurate (having accuracy below a threshold value or having a confidence score below a threshold value), the ensembled oracle 230 uses the prediction of the knowledge model 210. If the ensembled oracle 230 determines that the prediction of the generalized model 220 is accurate (having accuracy above a threshold value or having a confidence score above a threshold value), the ensembled oracle 230 uses the prediction of the generalized model 220.

In an embodiment, the ensembled oracle 230 determines a result by combining the results of the generalized model 220 and the knowledge model 210. For example, if the output of each of the knowledge model 210 and the generalized model 220 is boolean, the ensembled oracle 230 performs an AND operation on the outputs of the knowledge model 210 and the generalized model 220 and returns the result of the AND operation as the overall prediction. In an embodiment, the ensembled oracle 230 determines the final result by taking a weighted aggregate of the outputs of the knowledge model 210 and the generalized model 220. The weights assigned to each output may be determined based on a measure of accuracy of the corresponding models executed for determining the output.

In an embodiment, the ensembled oracle 230 compares the accuracy of the knowledge model 210 and the generalized model 220 and selects the output of the model that has higher accuracy. In an embodiment, the ensembled oracle 230 itself is a machine learning based model.

The result of the ensembled oracle 230 is used by a production system for operation. The results are also stored (e.g., logged) and used later for evaluation of the models, for example, knowledge model 210 and generalized model 220. For example, the execution results may be provided by the system to an expert user. The expert user may revise the rules or threshold values used by rules for subsequent execution based on the past execution results. Accordingly, the system receives revised rules subsequent to presentation of the execution results.

The knowledge model 210 is also used for generating training data, for example, for labelling data used for training the generalized model 220. However, the knowledge model 210 is also used at execution time for making predictions when the results of the generalized model are determined to have low accuracy.

The data synthesizer 240 includes a model used for automatically generating data relevant for a system, for example, industrial system. The data synthesizer 240 may include a mathematical model that may be provided by experts. The data synthesizer 240 may include representations of noise that can be added to data generated using mathematical models to determine realistic data that may be used as initial training data set. The training data set generated by the data synthesizer 240 is used for training of the generalized model 220. The model used by the data synthesizer 240 for generating may be domain specific. However, the data synthesizer 240 may use generic techniques such as Monte Carlo techniques to generate data.

In an embodiment, each of the knowledge model 210 and the generalized model 220 can be configured to perform preprocessing of the input data. In an embodiment, the outputs of each of the knowledge model 210 and the generalized model 220 are in the same format, structure, and type so that the ensembled oracle 230 can combine the two outputs to generate the final output. The same raw data is provided as input to both the knowledge model 210 and the generalized model 220, however, the preprocessing of the two models may be different.

The knowledge modeler 250 allows an expert to configure the knowledge model 210. In an embodiment, the knowledge modeler 250 configures a user interface and send it for presentation to an expert user. The expert user can use the user interface to perform operations such as setting thresholds, creating polygons and shapes to create boundaries to mark subsets of data that are associated with specific semantics or for labelling the data, and so on.

Overall Process

Figure 3:
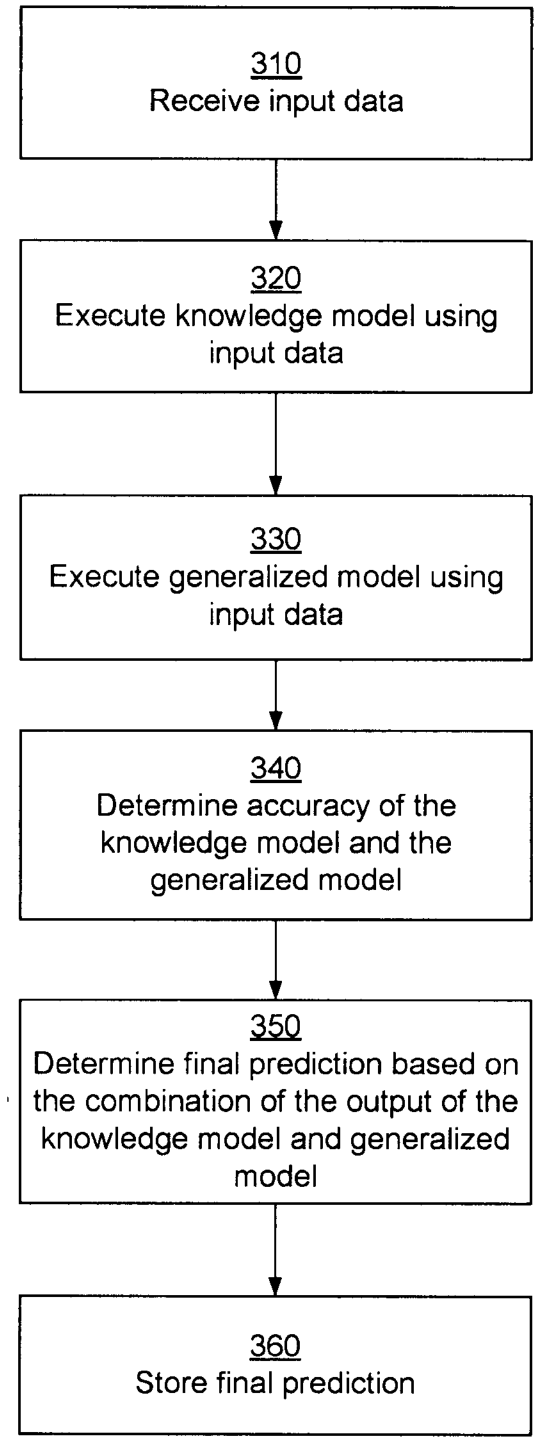
FIG. 3 illustrates the overall process for making predictions using a knowledge first architecture, according to an embodiment of the invention.

FIG. 3 illustrates the overall process for clustering time series data, according to an embodiment of the invention. The steps illustrated in the process may be performed in an order different from that indicated in FIG. 3. Furthermore, the steps are indicated as being performed by a system, for example, the knowledge based AI system 150 and may be performed by the appropriate module as shown in FIG. 2 and described in connection with description of FIG. 2.

The system receives 310 input data that needs to be processed for making certain prediction. The input data may be sensor data, event data generated by a system, user data, or any other type of data that may be provided as input to a model for making predictions. The system executes 320 the knowledge model 210 using the input data to generate an output, for example, $O_1$. The system executes 330 the generalized model 210 using the input data to generate another output, for example, $O_2$. The system determines 340 the accuracy of each of the knowledge model 210 and the generalized model 220. The system determines 350 a final prediction, for example, $O_3$ based on the combination of the output $O_2$ of the knowledge model 210 and the output O2 of the generalized model 220. The system stores the final prediction $O_3$ and also uses it for taking further downstream actions.

Figure 4:
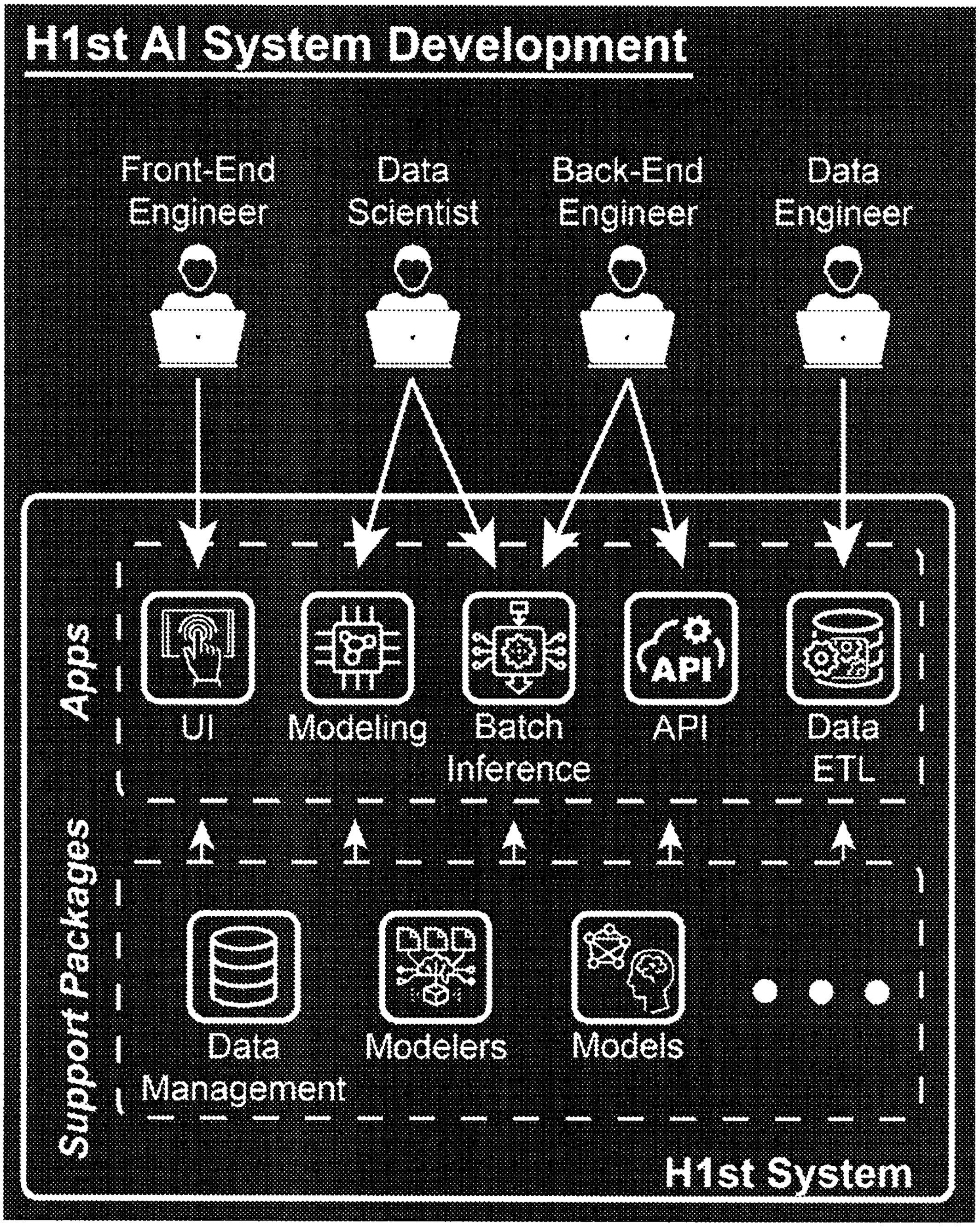
FIG. 4 shows a development system for use for building AI systems according to an embodiment.

FIG. 4 shows a development system for use for building AI systems according to an embodiment. The development system is based on a particular structure for comprehensive AI systems, i.e., systems that go all the way from development to operation, made up of multiple microservices (apps) working together to meet system demands. Notebooks are sufficient for one model, not the whole system. The development system provides the tools needed to utilize individual streams of development. For example, back-end engineers can work on creating the batch inference app even before models are created since certain functionality is guaranteed in all models, ML or otherwise. The development system allows multiple people to progress separate development streams simultaneously while maintaining system integrity.

Figure 5:
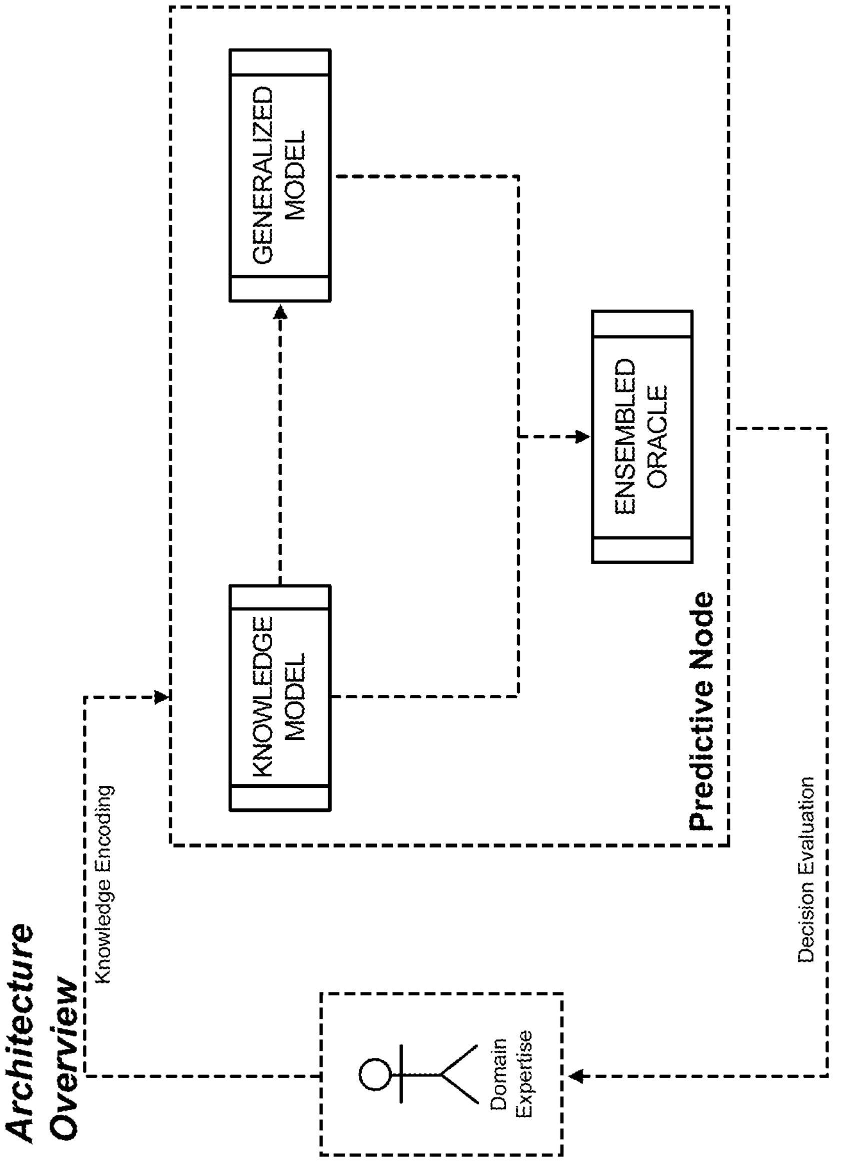
FIG. 5 illustrates the overall architecture of the knowledge based AI system according to an embodiment.

FIG. 5 illustrates the overall architecture of the knowledge based AI system according to an embodiment. The diagram illustrates the interactions between the domain experts and the various components of the knowledge based AI system 150 for making predictions.

Figure 6:
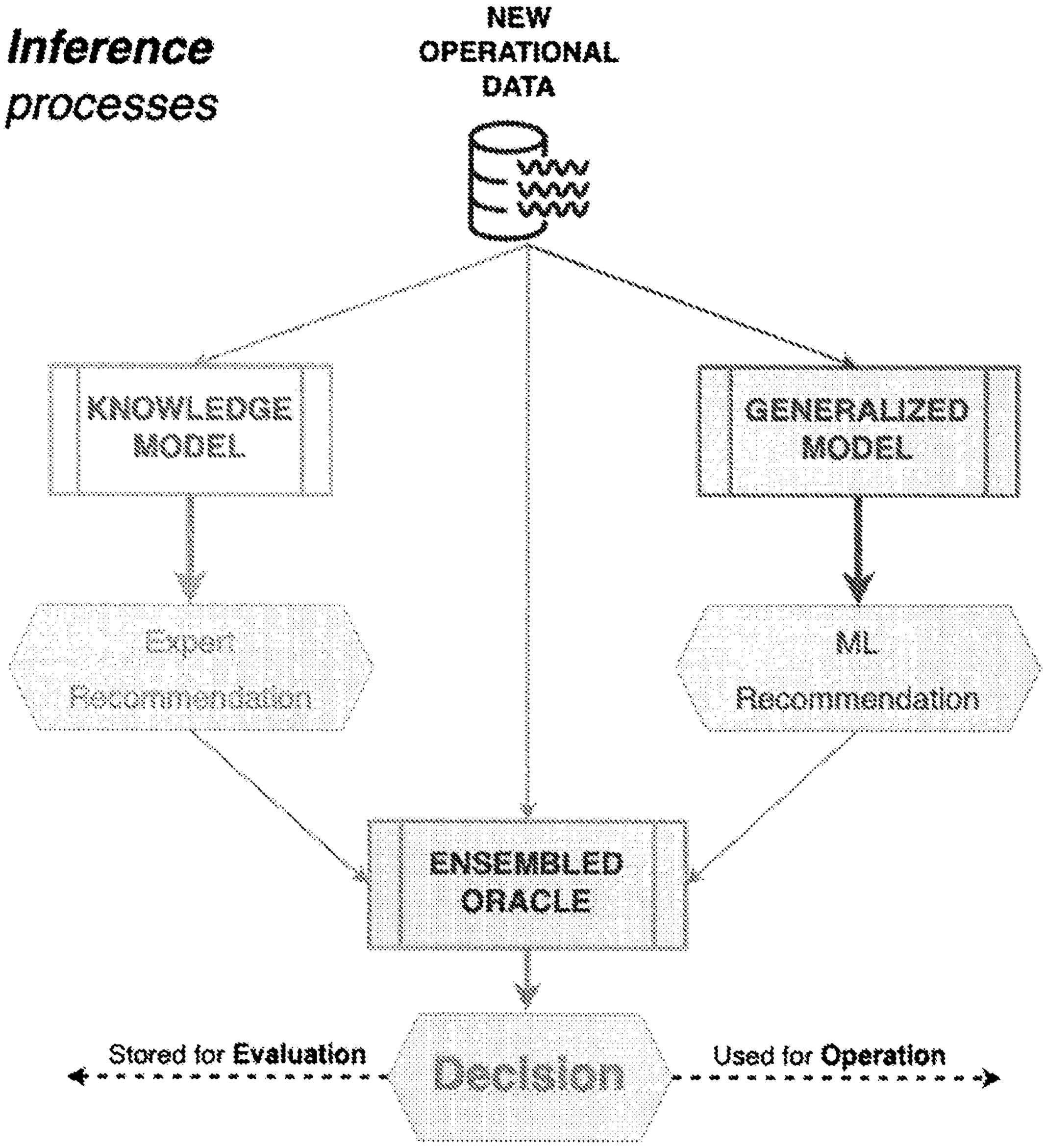
FIG. 6 illustrates the overall process of making predictions using the knowledge based AI system according to an embodiment.

FIG. 6 illustrates the overall process of making predictions using the knowledge based AI system according to an embodiment. FIG. 6 illustrates the flow of information through the various components of the knowledge based AI system 150.

Figure 7:
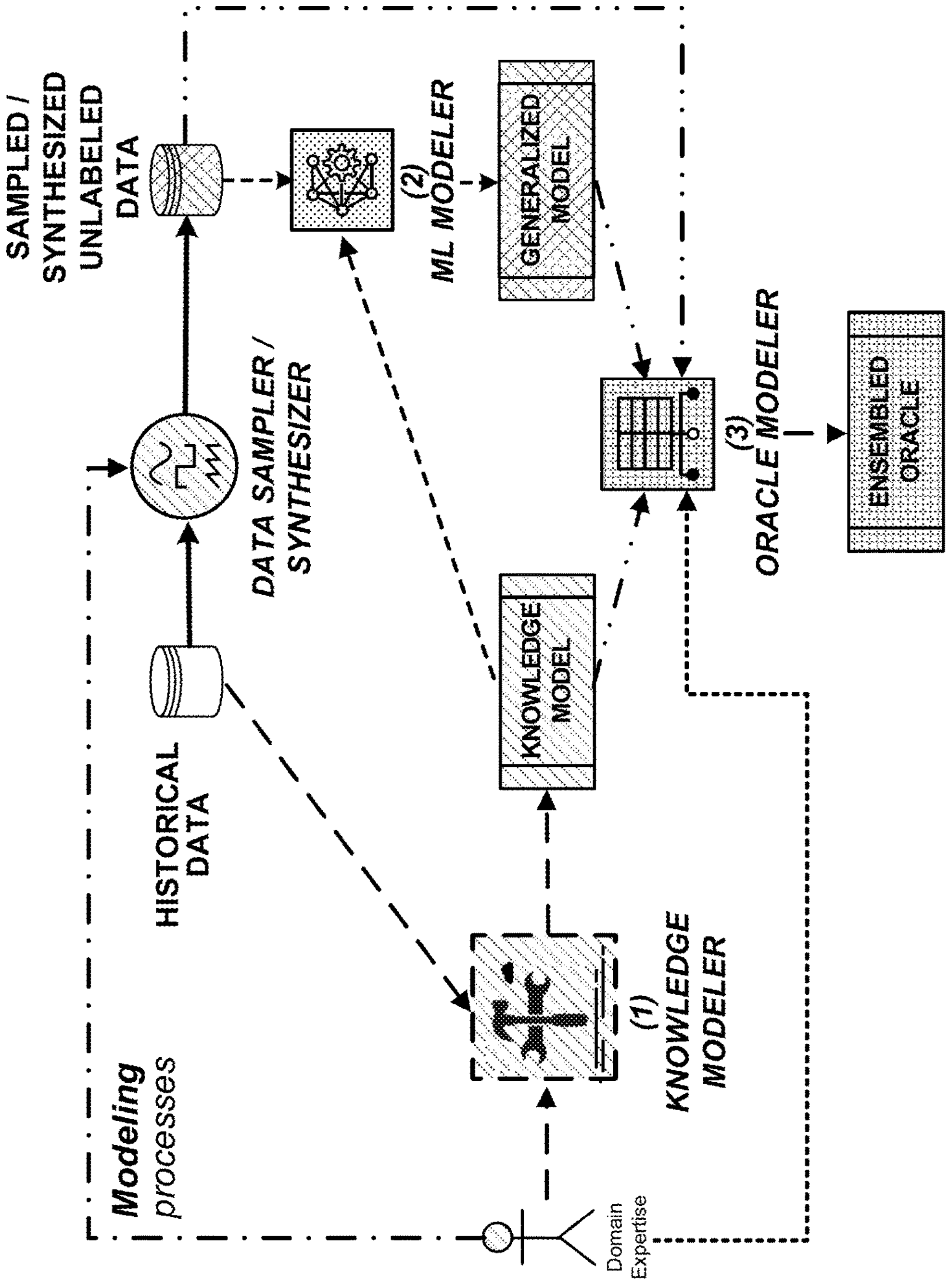
FIG. 7 illustrates the use of various tools for use with knowledge based AI system according to an embodiment.
Figure 8:
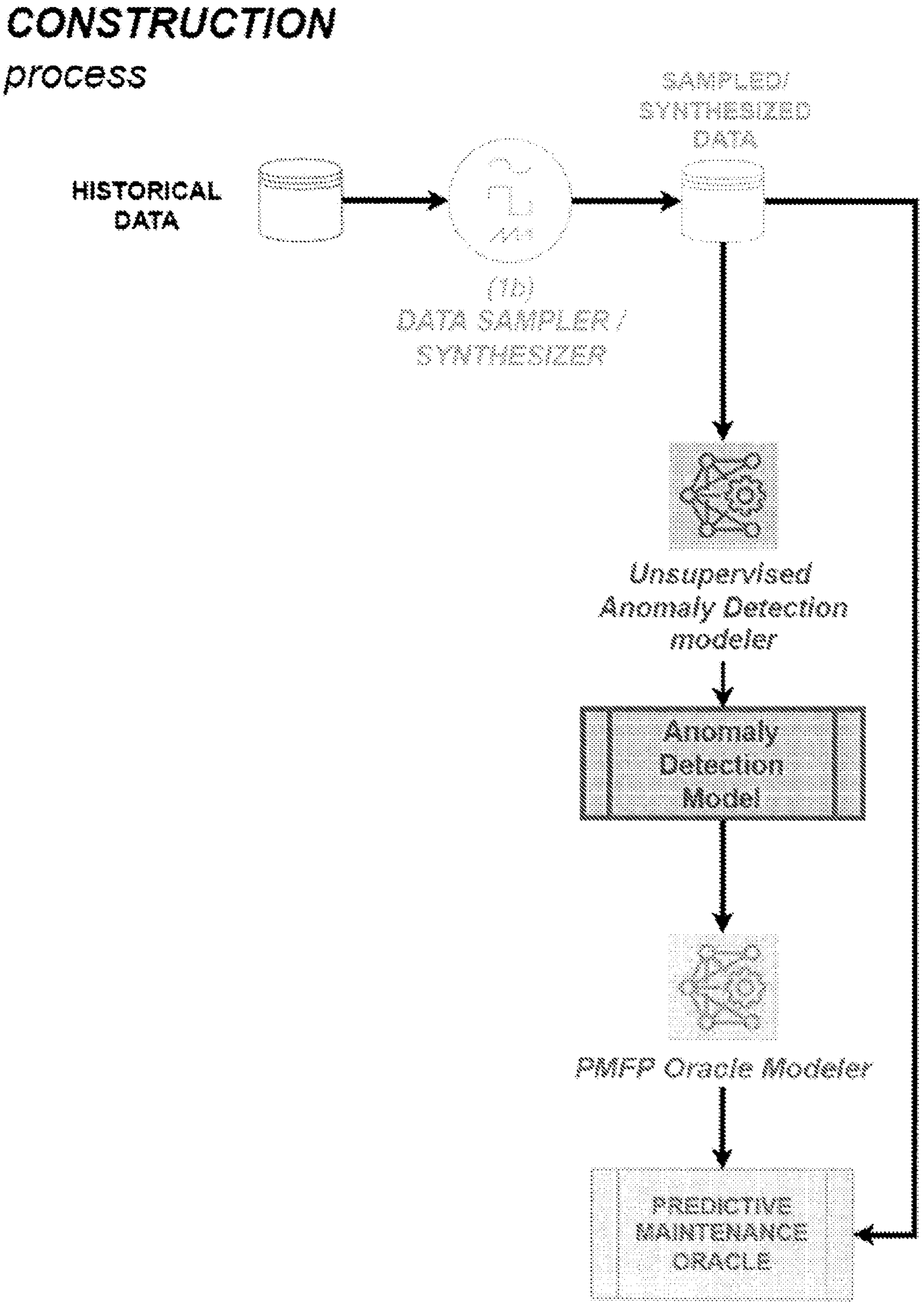
FIGS. 8-11 illustrate the use of the knowledge based AI system for applications according to various embodiments.
Figure 9:
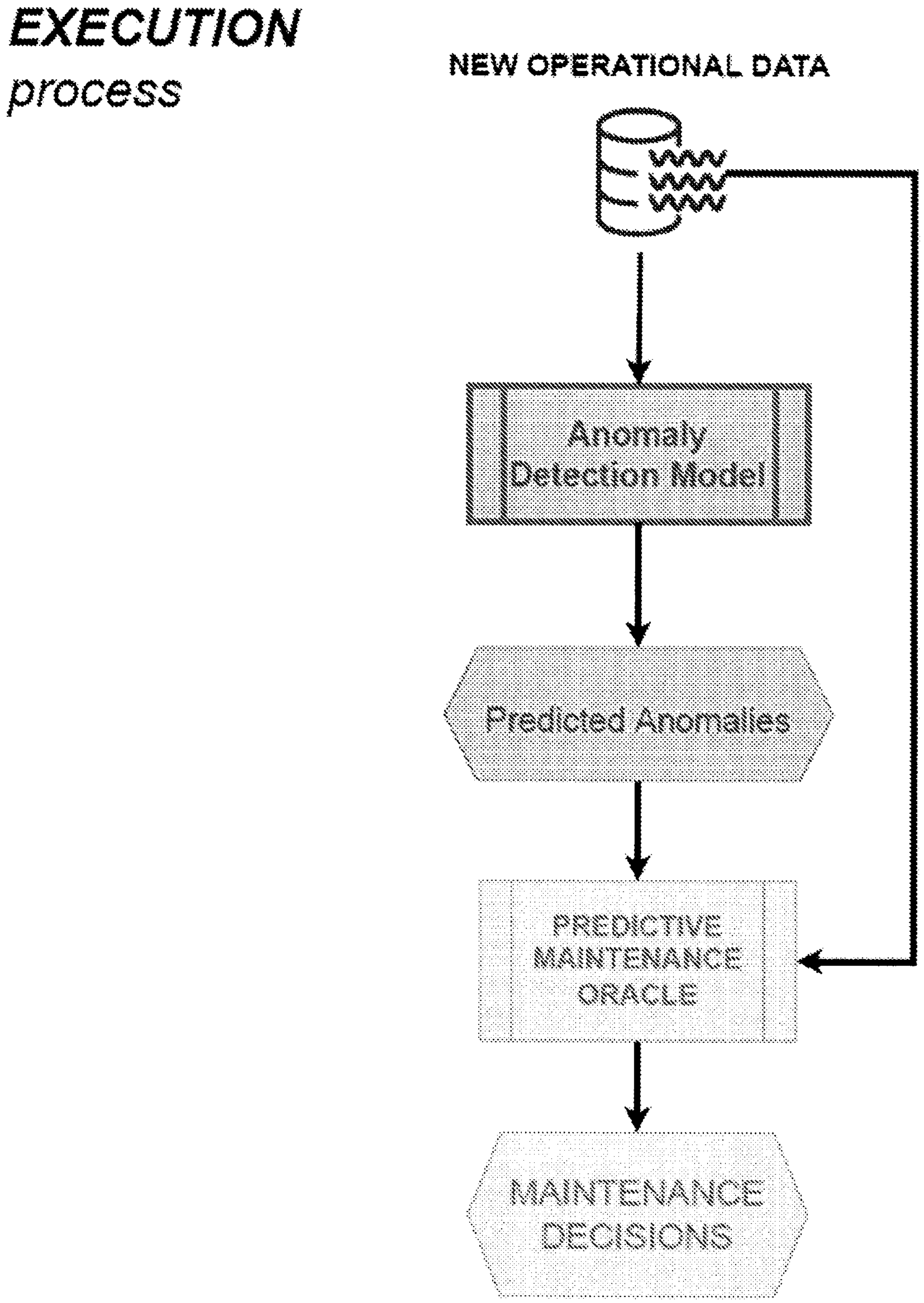
Figure 10:
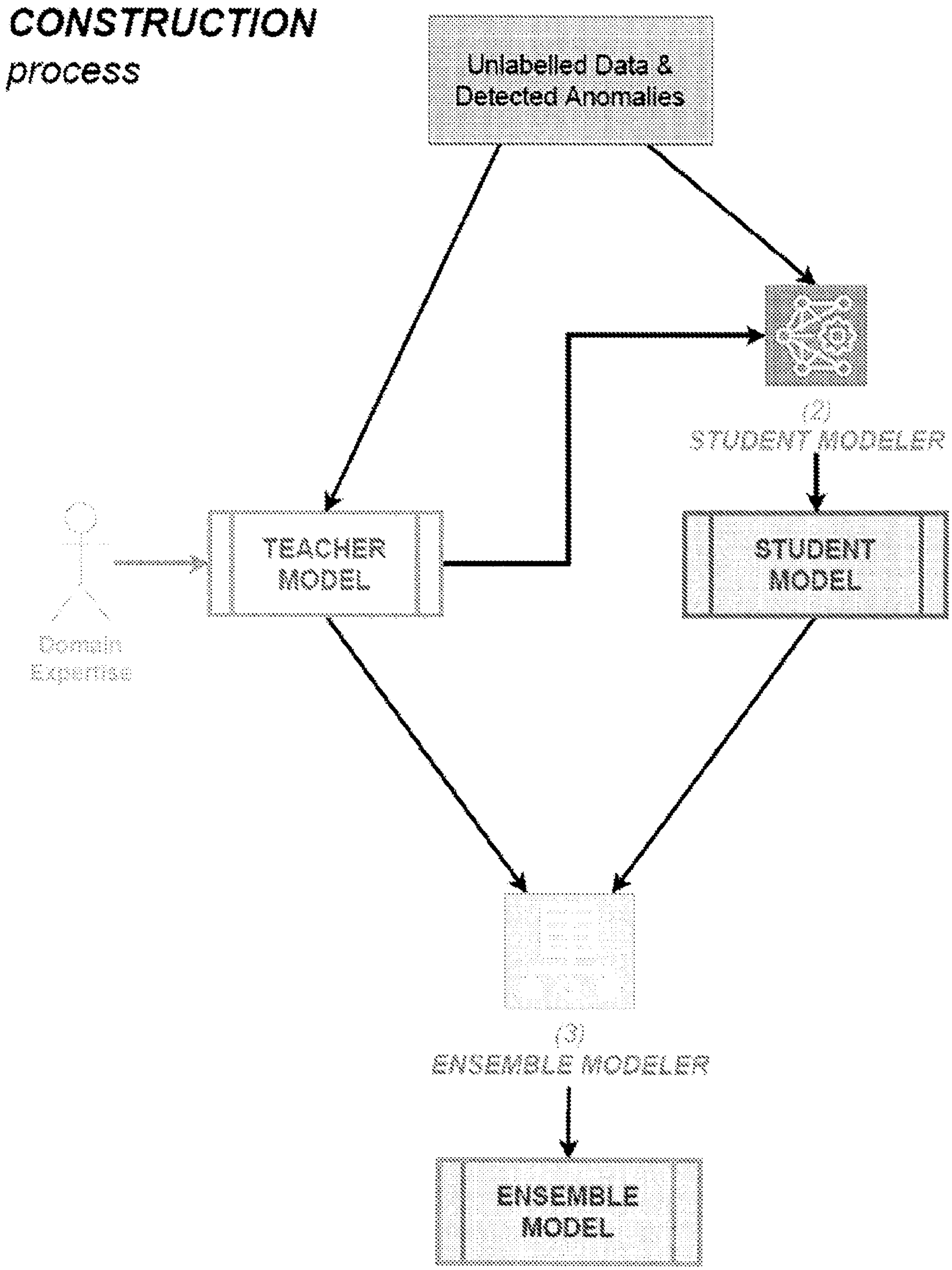
Figure 11:
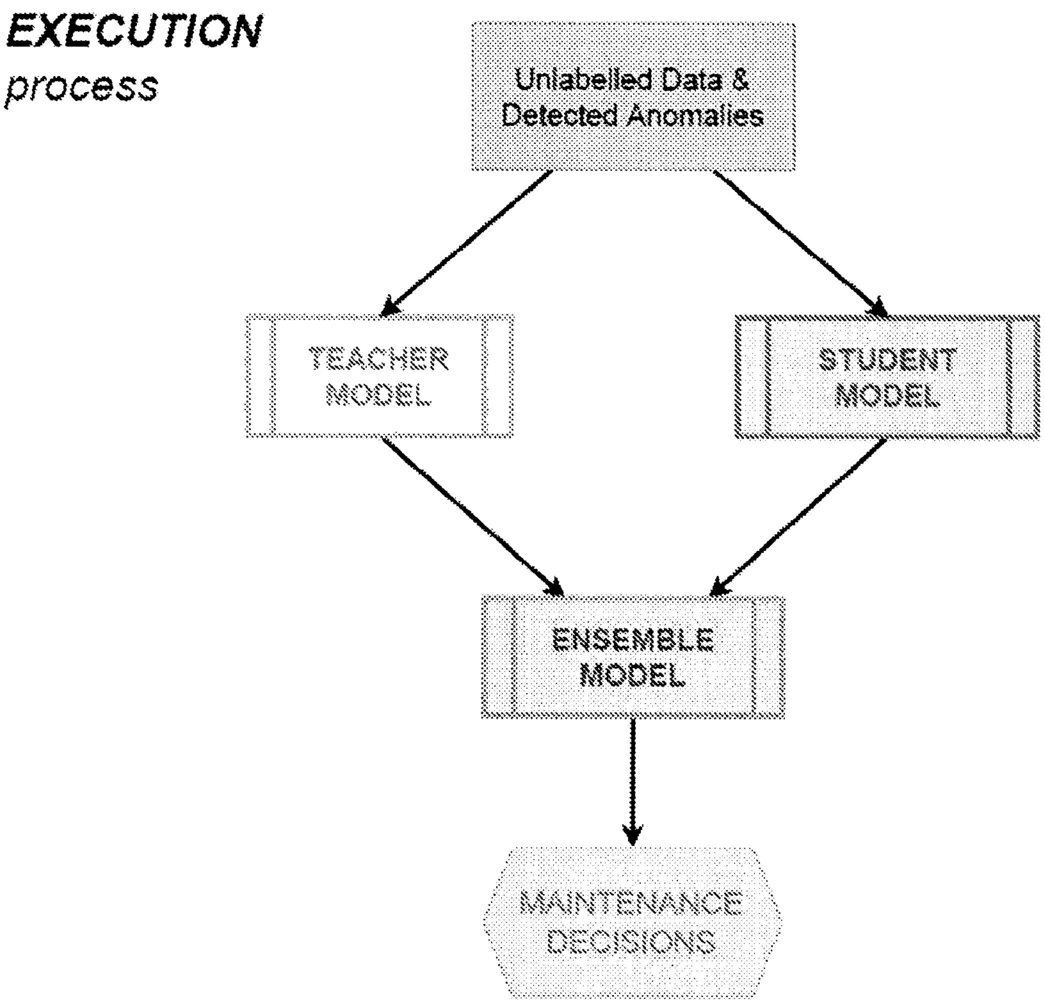

FIG. 7 illustrates the use of various tools for use with knowledge based AI system 150 according to an embodiment. For example, tools such as knowledge modeler and machine learning modeler may be used.

The knowledge first system 120 can be used for various applications, for example, applications in industrial systems. An example of an application where the knowledge first system 120 can be used is predictive maintenance and fault prediction of equipment.

FIGS. 8-11 illustrate the use of the knowledge based AI system for applications according to various embodiments.

The figures illustrate an application of an architecture referred to herein as the K1st Oracle architecture. This is a generalized application for predictive maintenance where first data passes through an unsupervised anomaly detection process and then through the k-Oracle. The Oracle is a node where a user provides the knowledge model (Teacher) and then the system creates the generalized ML model (student) and default Ensembler (which can be customized). The Teacher model comprises a collection of rules laid out by a domain expert, for example, rules dictating the type of faults associated with certain patterns in the data. For example, an expert could say 'If the Outlet temperature is higher than the inlet temperature by 40 deg C. then you're experiencing a coolant leak'. Accordingly, the Teacher model would include a rule 'If data["outlet_temp"]−data["inlet_temp"]>40: return "coolant_leak"'. During the training process all of the data goes through the teacher model to create the labels used to train the Student model (in one embodiment, the student model uses a Naive Bayes classifier at its base, however other embodiments may use deep neural network models). The advantage of this architecture is that ML models are more flexible and perform better on edge cases where the hardline Teacher model might become inaccurate. Finally, the outputs of both models are passed to the Ensemble models which decides how to determine the final result based on both predictions. In one embodiment, the Ensemble model simply combines the 2 inputs (for example if the Student and Teacher output boolean classification then an AND or OR gate might suffice), but the Ensemble could also receive evaluation metrics from the 2 models and decide which output to trust based on that. In an embodiment, if the outputs are numeric values the system uses the accuracy of each output to weight and average the outputs. All of these choices may be use case specific.

If there is sufficient labelled training data, the ensemble can be implemented as an ML model and learn on its own how to best leverage both model predictions to generate a decision. While most users with small data start out with a logical Ensemble, over time the system labels their data for the users and occasional expert evaluation/feedback is used to edit and modify that dataset, which over time becomes large enough to support training of an ML ensemble. The architecture uses the k-Oracle component and its varied possible implementations/uses. The system supports an expandable architecture that can be slotted into many use cases and serves as a simple method of integrating domain expertise into AI and leveraging it to overcome the hurdle of having little to no training data or labels. The system may also train and run without any data at all. In such embodiments, the ML model effectively gives a random output and the ensemble only uses the Teacher output, until sufficient data is available to train the Student.

Knowledge Translation

The K-Translator captures and translates rules and heuristics from experts. The K-translator also supports various other forms of explicit expert knowledge such as physical equations and groupings, trends and similarities. These are essential to various K1st modeling architectures and solutions. Various components of the system according to an embodiment include:

Knowledge Translator: Takes in natural language and output knowledge in a form processable by a teacher pipeline (Fuzzy pipeline, Boolean pipeline, etc.) to create a teacher model. The knowledge translator includes components such as a user interface, APIs, and knowledge storage.

Model Builder: Uses provided translated knowledge to build Teacher model or uses data and translated knowledge, or a Teacher, to build K1st model. The model builder includes various subcomponents including modules implementing processes for model creation, classes to support models, a user interface component, APIs, CLI (command line interface), and storage for storing models.

Model Manager implements an interface to view, evaluate & deploy models

Knowledge Manager implements an interface to view, revise and access raw & translated knowledge Data Manager implements an interface to view & upload or create datasets or data descriptions. Data manager includes sub-components such as a user interface and data storage.

Model Serving System to run K1st models and access them for inference

Web Application: Overarching K1st web application containing the above UIs.

The system includes an execute component that allows deployment and execution of generated models and applications based on the generated models. This allows project managers or AI engineers to manage multiple deployed applications and models. The components within the execute component include the following.

A Model Management component (Web UI & CLI) that provides a User interface for viewing constructed K1st models within an application, viewing model evaluation results, assigning tags to models (soft versioning to support changing the model used in an app without needing to redeploy the app, for use in load on inference situations [most useful for dev]) and upgrading models to production deployment (dedicated deployment of a model with consistent endpoint for use in production applications)

A Model Serving component (Web API) that allows all models to be easily accessed through a web API via usage of the model name, model version and an API Access Token. This component allows users to be able to easily use/test all models built; publish production level models that can reliably execute quickly; For cases in which latency or high inference volume are concerns, the system allows users to deploy models to production level environments to run in their own container to remove the overhead for model loading. The K1st Execute UI allows users to change which model version is deployed in this manner so that models can be updated without need for application redeployment.

An application management component (Web UI & CLI) provides a user interface to provide users an overview of their running applications on the system. The component allows users to: start & stop applications; view application logs; perform resource monitoring; monitor application usage; re-deploy applications; and connect to user code. The system also includes an application hosting component.

Figure 12:
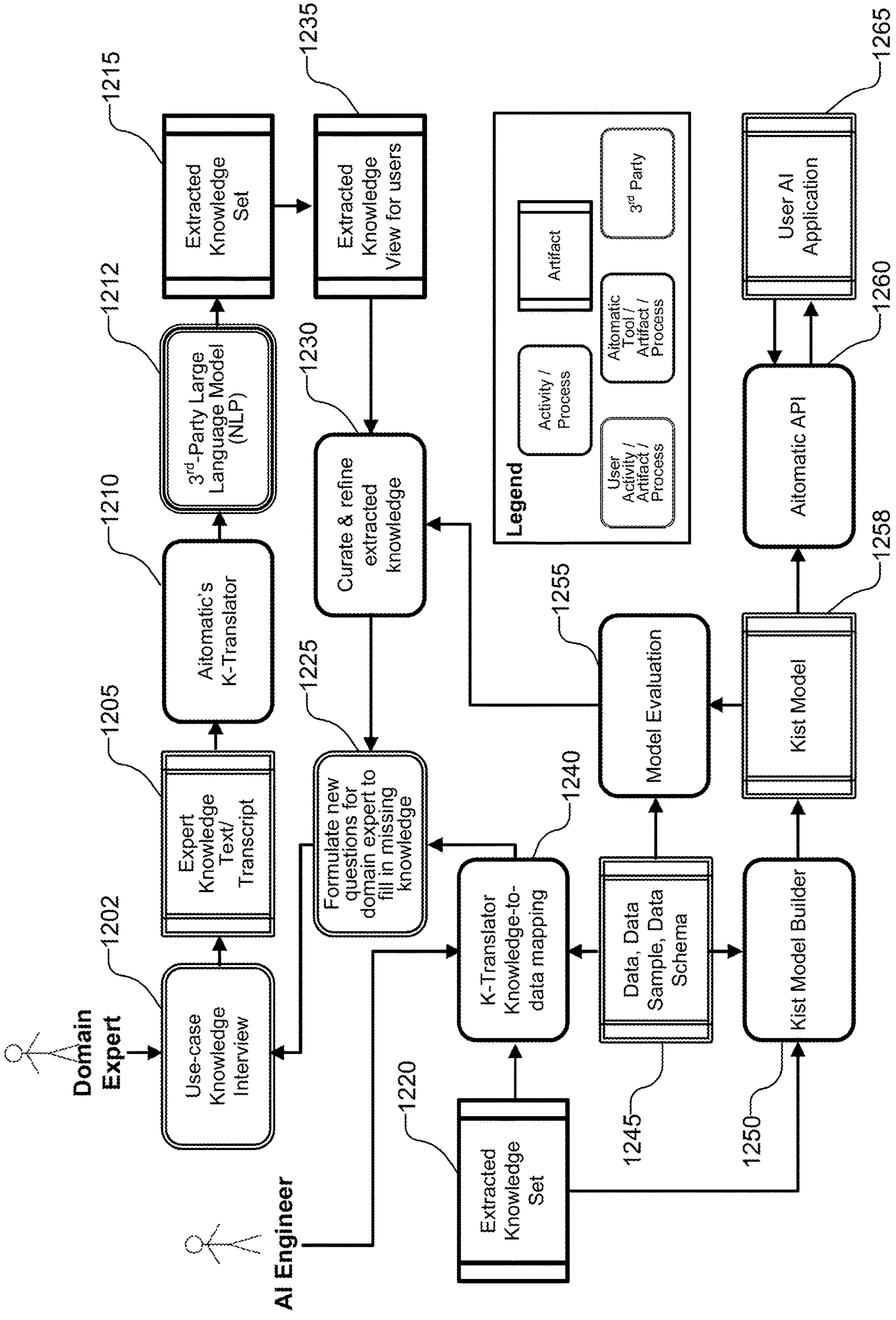
FIG. 12 illustrates the flow of knowledge extraction and building of models for a particular domain, according to an embodiment.

FIG. 12 illustrates the flow of knowledge extraction and building of models for a particular domain, according to an embodiment. The system stores extracted knowledge set 1220 and data, data samples, data schema 1245. The K-translator performs knowledge to data mapping 1240 with the help of a user such as an AI engineer. A user such as an AI engineer performs a use-case knowledge interview 1202 with a domain expert to obtain an expert knowledge text/transcript 1205. New questions are formulated 1225 for the domain expert to fill in missing knowledge. The k-translator 1210 translates the expert knowledge text/transcript 1205 using a language model 1212 to obtain extracted knowledge set 1215. An extracted knowledge view 1235 is generated for the users. The extracted knowledge is curated and refined 1230 and used for formulating 1225 new questions. The system includes a model builder 1250 that generates models 1258 from the extracted knowledge set 1220. The system performs model evaluation 1255 of the generated models 1258. User AI applications 1265 interact with the models 1258 using application programming interfaces (APIs) 1260.

Following is the description of a domain specific language according to an embodiment. The system uses artificial intelligence techniques to identify features. Each feature specifies one or more membership classes. Each membership class may specify ranges of values or threshold values to define the categories for the feature. The system performs natural language processing to identify potential features for a model based on the expert knowledge. The system performs natural language processing to identify upper and lower limits of features. The features represent attributes specified by the knowledge text. The features may map to columns or attributes in a dataset. The system extracts rules based on the features. The system further extracts conclusions based on the knowledge text. A conclusion may infer information based on specific rules or combination of rules. For example, if a set of rules evaluate to true, then there is leakage in the system or there is a particular type of problem in the system. The information extracted by the system can be used to generate a model, for example, a fuzzy model, a boolean model, or any other kind of model based on the knowledge provided by the domain expert.

```
# annotations after character '#' are not part of language
[features]
feature name 1
-->membership class 1:: ## to max # max is a reserved word for feature max value
-->membership class 2:: ## to ### ## would be an actual number, to is reserved word
-->membership class 3:: min to ### min is a reserved word for feature min value
-->membership class 4:: undefined var 1 to undefined var 2
# values implied by knowledge by not given a value are either assigned names or a name is extracted from the knowledge
# empty line after each feature for parsing and readability
feature name 2
-->membership class 1:: is ### is is a reserved word for equal to a specific number
feature name 3
-->membership class 1:: is "string" # can even define string/categorical values
[rules] # this section is solely for aliases to simplify conditions and keep visuals clean
Rule 1:=feature name 1[membership class 2] & feature name 2[membership class 1]
Other Rule:=((feature name 3[membership class 1] & feature name 1[membership class 1])|
feature name 2[membership class 1])
# alias names are not constrained
#:=signal definition
# parentheses and logic operators work the same as in python
# newlines, tabs and extra spaces are ok as long as var names (such as "feature name 2") aren't interrupted and parentheses are enclosing the statement
Rule 2:=Rule 1 & not Other Rule
# aliases can be used in other aliases, they are processed in order, top to bottom
# "not" is also a valid logic statement
[conditions] # for output conditions, the left side of definitions here will be used for modeling
Conclusion 1[True]:=Rule 1|feature name 1[membership class 3]
Conclusion 2:=Rule 1 & Other Rule for >##<time unit># "for" designates temporal conditions
# a temporal condition must have >, < or =sign before it to give time relation
# lack of "[True]" or "[False]" tag implies "[True]"
% Conclusion 3[False]:=Other Rule # "%" comments out line and prevents use in modeling
# Existence of a membership tag (e.g. "[True]") existence because sometimes knowledge is
[undefined variables] # this section is not created by GPT-3 but extracted from [features]
# this section lets users easily see missing bits of knowledge and fill in those gaps
undefined var 1
undefined var 2=10
# if a user defines a variable value here, the next time it is processed the variable will be replaced in features and dropped from [undefined variables]
```

An example of knowledge text that may be obtained from a domain expert is the following paragraph: "So we have 3 showcases, these showcases all have temperatures below 7.5 degrees in normal operation. Now if all of those temperatures are above 7.5 degrees then I'll check the condensing pressure and the evaporation pressure. If both are low for more than 3 hours then you're probably looking at a refrigerant leakage. But if both are high then the condenser is not clean. And if the condensing pressure is low, like below 8, and the evaporation pressure is high, like over 1.5, for more than 5 hours then it's an expansion valve leakage. Finally, if any of the showcases have a temperature above 7.1 degrees then look at the return gas temperature. when that is below 0 then you're facing an evaporation frost problem."

The knowledge translator extracts knowledge including variables, conclusions, and definitions.

[features]
showcase temperature 1
-->high:: 7.5 to max
-->normal:: set temperature to 7.5
-->low:: min to set temperature
-->higher:: 10 to max
showcase temperature 2
-->high:: 7.5 to max
-->normal:: set temperature to 7.5
-->low:: min to set temperature
-->higher:: 10 to max
showcase temperature 3
-->high:: 7.5 to max
-->normal:: set temperature to 7.5
-->low:: min to set temperature
-->higher:: 10 to max
condensing pressure
-->high:: condensing pressure high threshold to max
-->low:: min to condensing pressure low threshold
evaporation pressure
-->somewhat high:: 1.5 to max
-->high:: 1 to max
-->normal:: 0.5 to 1
-->low:: min to 0.5
return gas temperature
-->low:: min to 0
machine
-->machine type 1:: is "Whirlpool Max M3"
[rules]
Rule 1:=(showcase temperature 1[high] & showcase temperature 2[high] & showcase temperature 3[high])
Rule 2:=(showcase temperature 1[higher]|showcase temperature 2[higher]|showcase temperature 3[higher])
Rule 3:=condensing pressure[low] & evaporation pressure[low]
Rule 4:=condensing pressure[high] & evaporation pressure[high]
Rule 5:=condensing pressure[low] & evaporation pressure[somewhat high]
Rule 6:=(showcase temperature 1[low]|showcase temperature 2[low]|showcase temperature 3[low])
[conclusions]
refrigerant leakage[True]:=Rule 1 & Rule 3 for >3 hr
condenser not clean[True]:=Rule 1 & Rule 4
expansion valve leakage[True]:=Rule 1 & Rule 5 for >5 hr
evaporation frost problem[True]:=Rule 2 & return gas temperature[low]
cooling cutoff failure[True]:=Rule 6 & machine[machine type 1]
[undefined vars]
set temperature=30
condensing pressure high threshold
condensing pressure low threshold The system uses the extracted information for building models.

FIGS. 13A-K show screenshots of a user interface illustrating the process of extracting knowledge and creating models according to an embodiment.

Figure 13A:
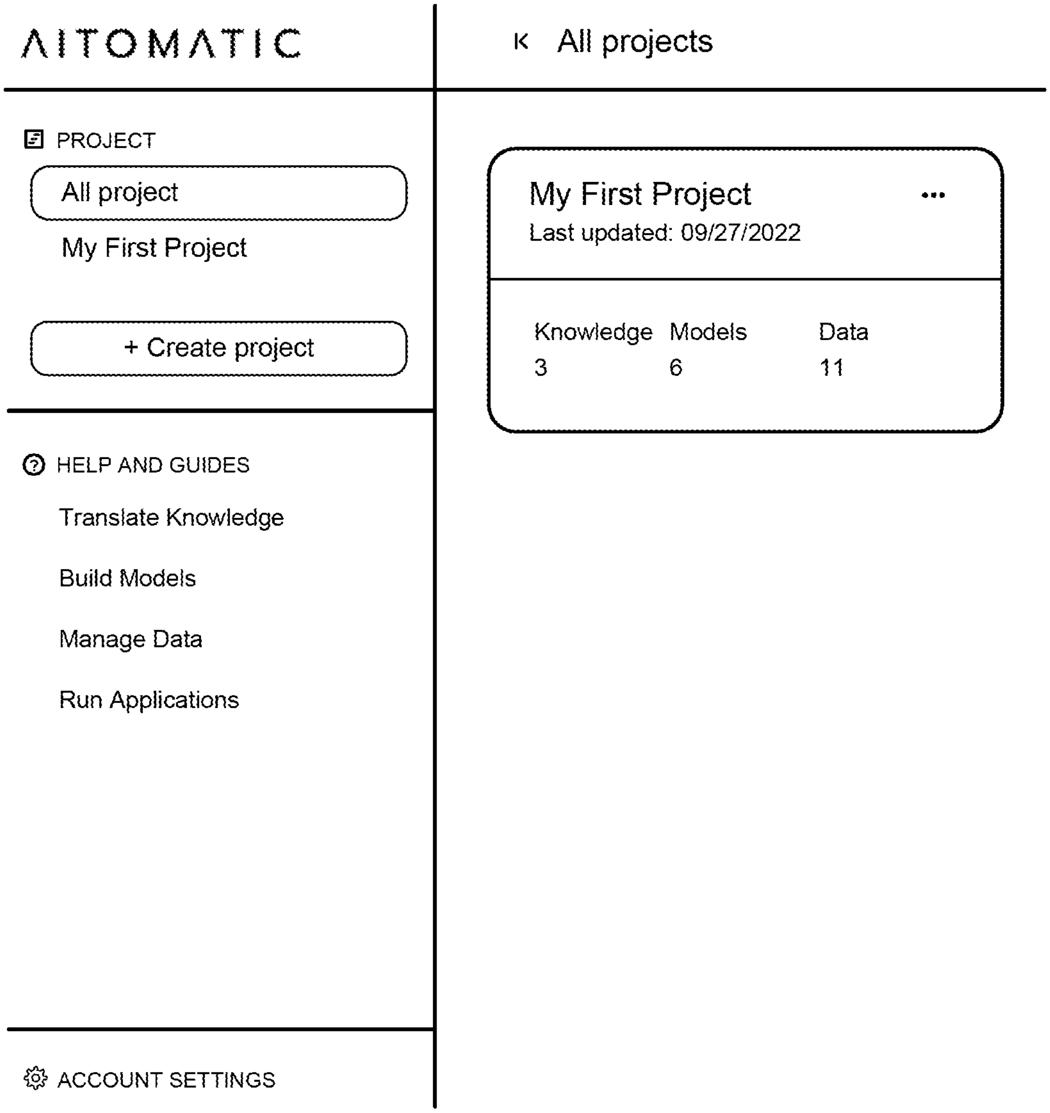
FIGS. 13A-K show screenshots of a user interface illustrating the process of extracting knowledge and creating models according to an embodiment.

FIG. 13A shows a screenshot of a user interface illustrating creation of a new project and viewing existing projects.

Figure 13B:
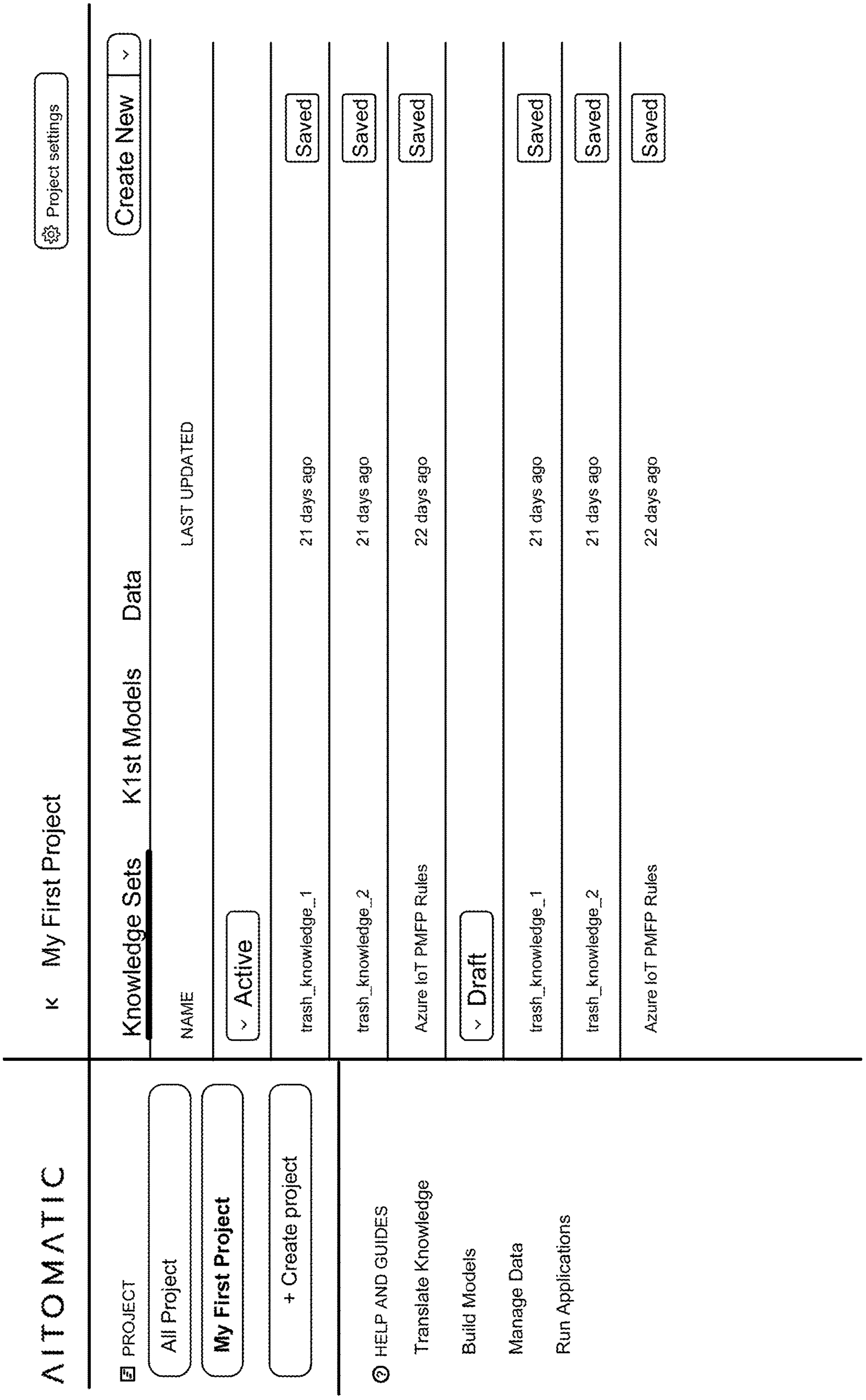

FIG. 13B shows a screenshot of a user interface illustrating monitoring of projects, for example, by viewing various knowledge sets, models, and data in each project.

Figure 13C:
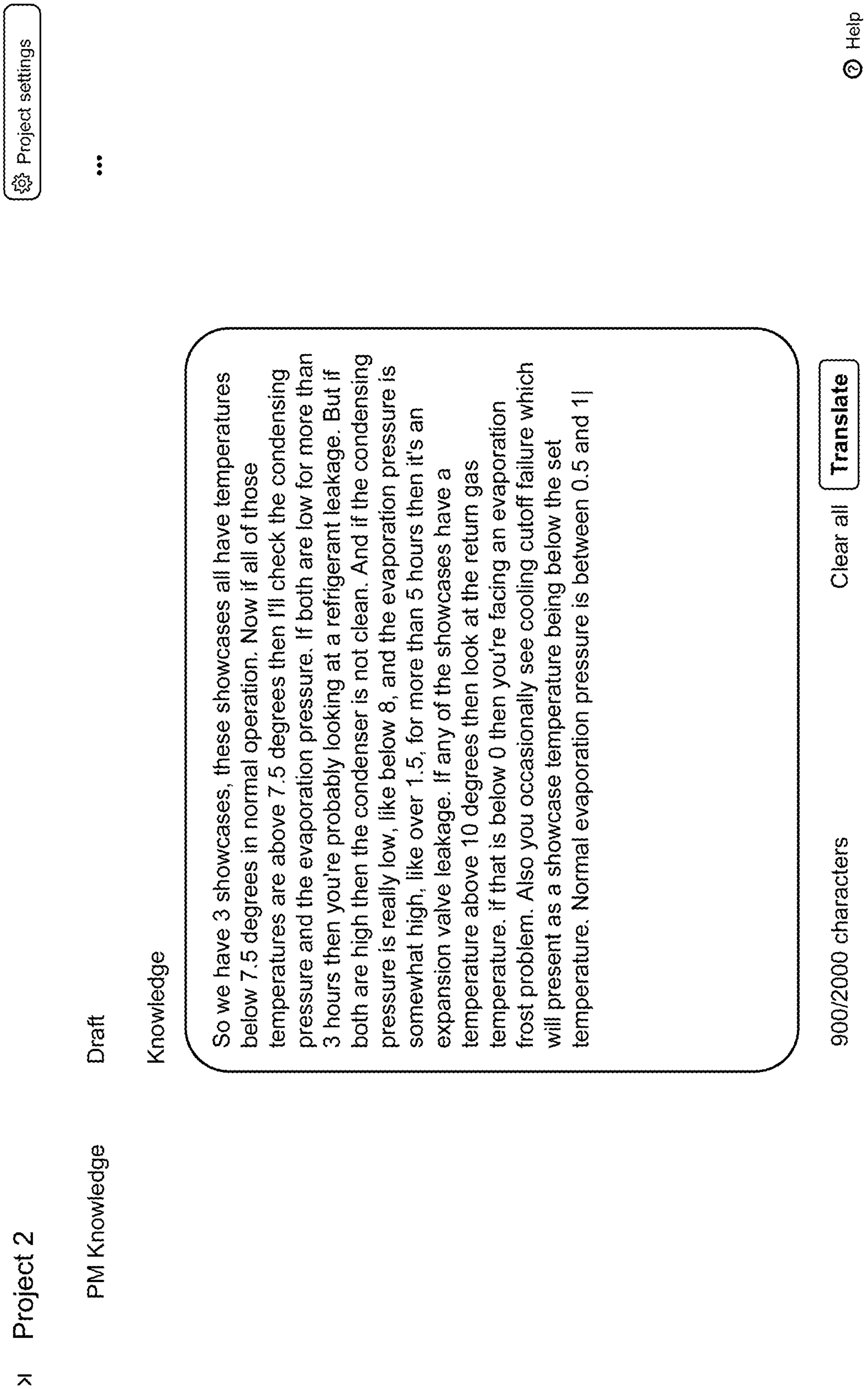

FIG. 13C shows a screenshot of the user interface for receiving knowledge text from a domain expert.

Figure 13D:
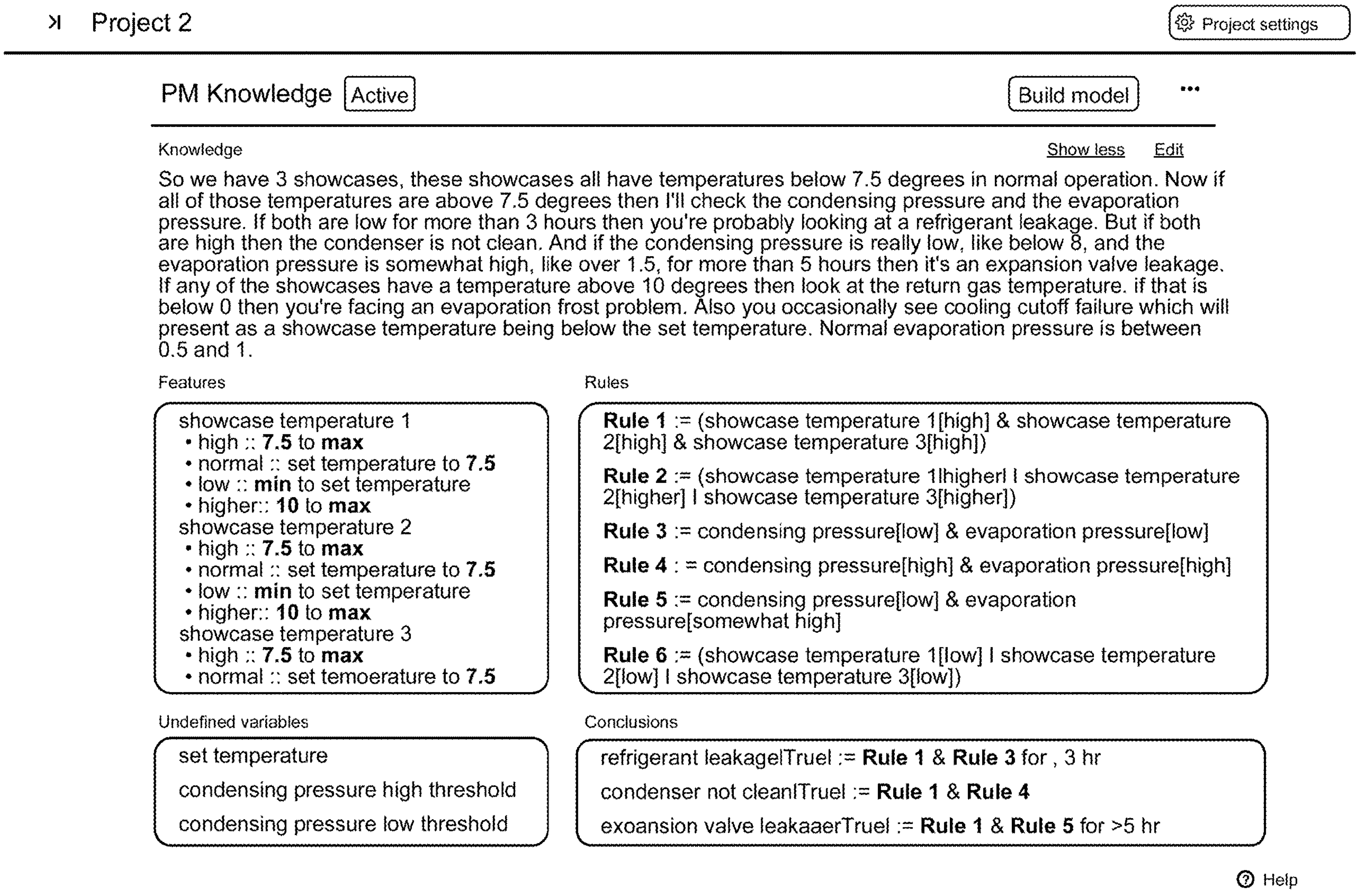

FIG. 13D shows a screenshot of the user interface illustrating information extracted from the knowledge text received from a domain expert including features, rules, conclusions, and so on.

Figure 13E:
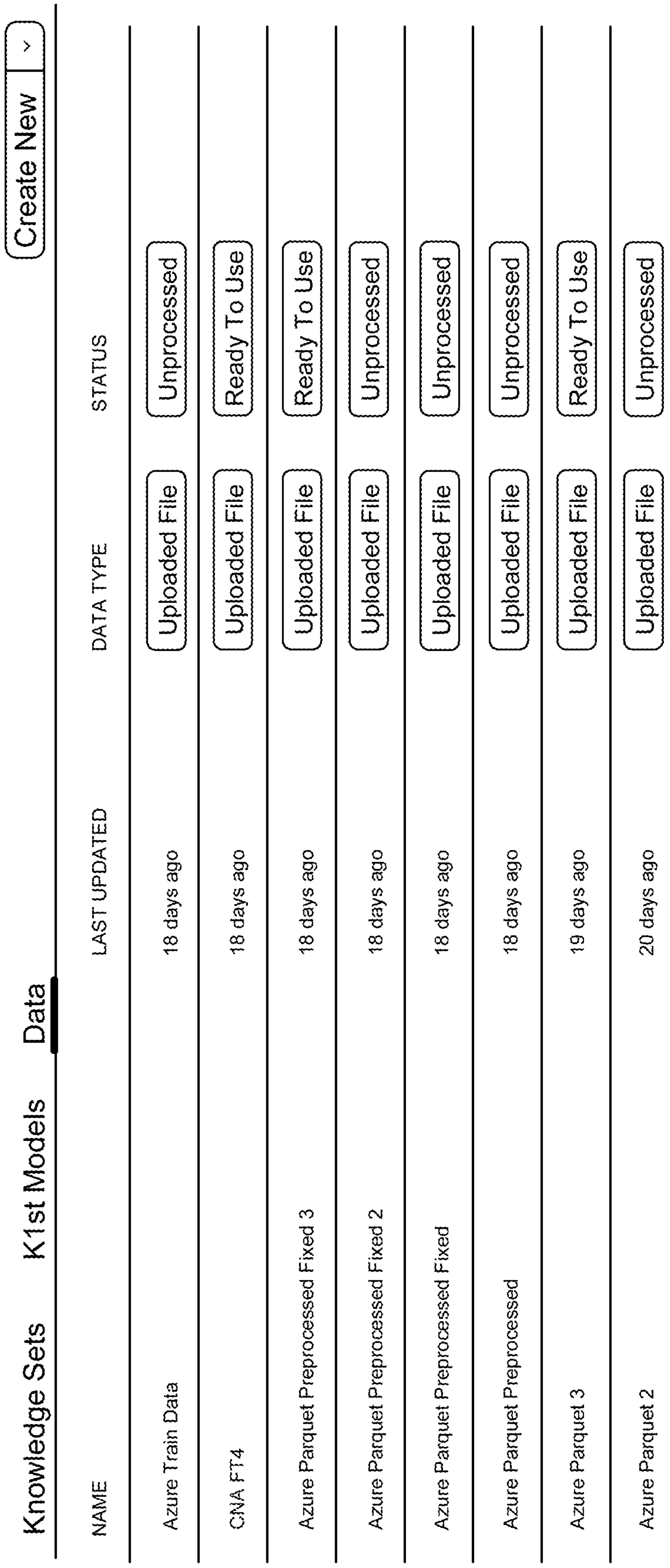

FIG. 13E shows a screenshot of the user interface for displaying details of a various datasets.

Figure 13F:
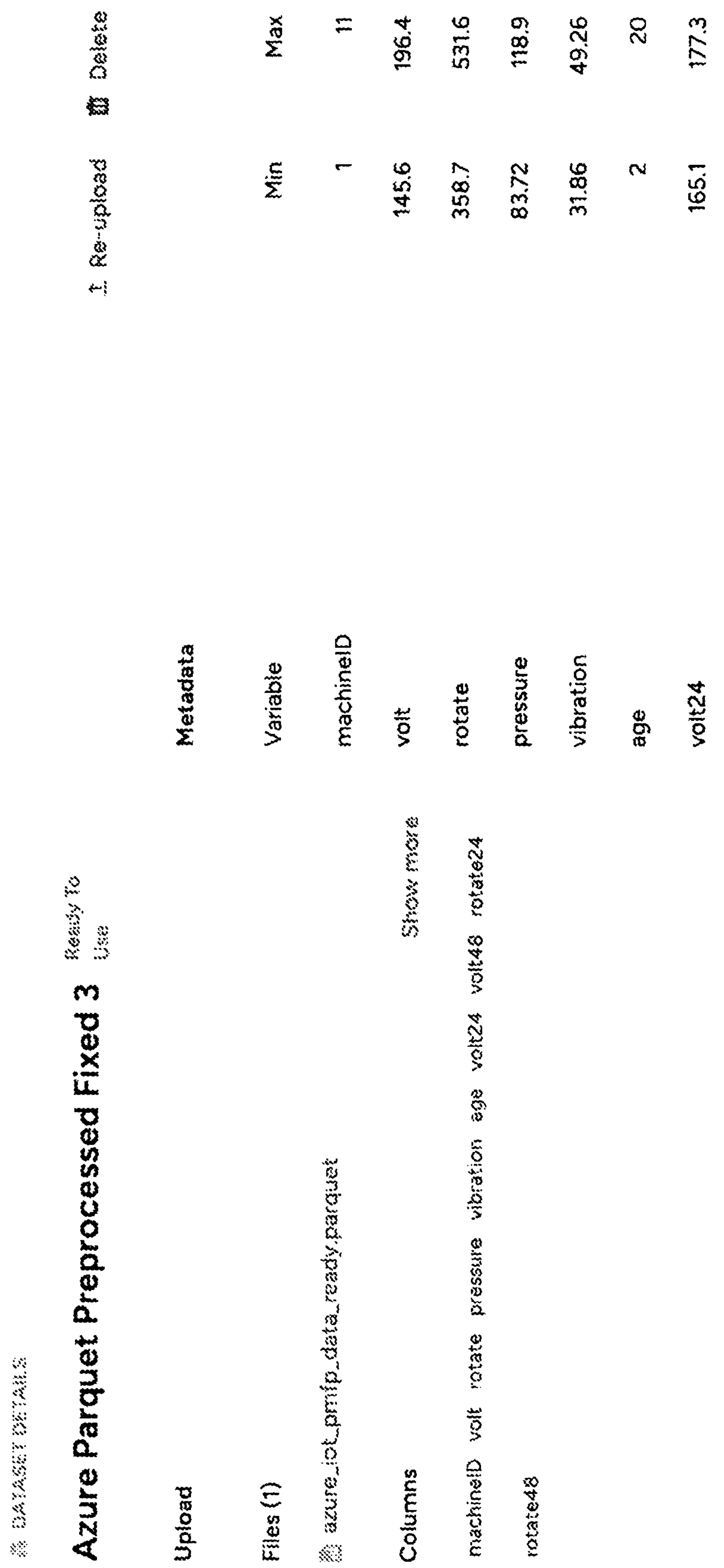

FIG. 13F shows a screenshot of the user interface for displaying details of a particular dataset, for example, various columns/attributes of the dataset.

Figure 13G:
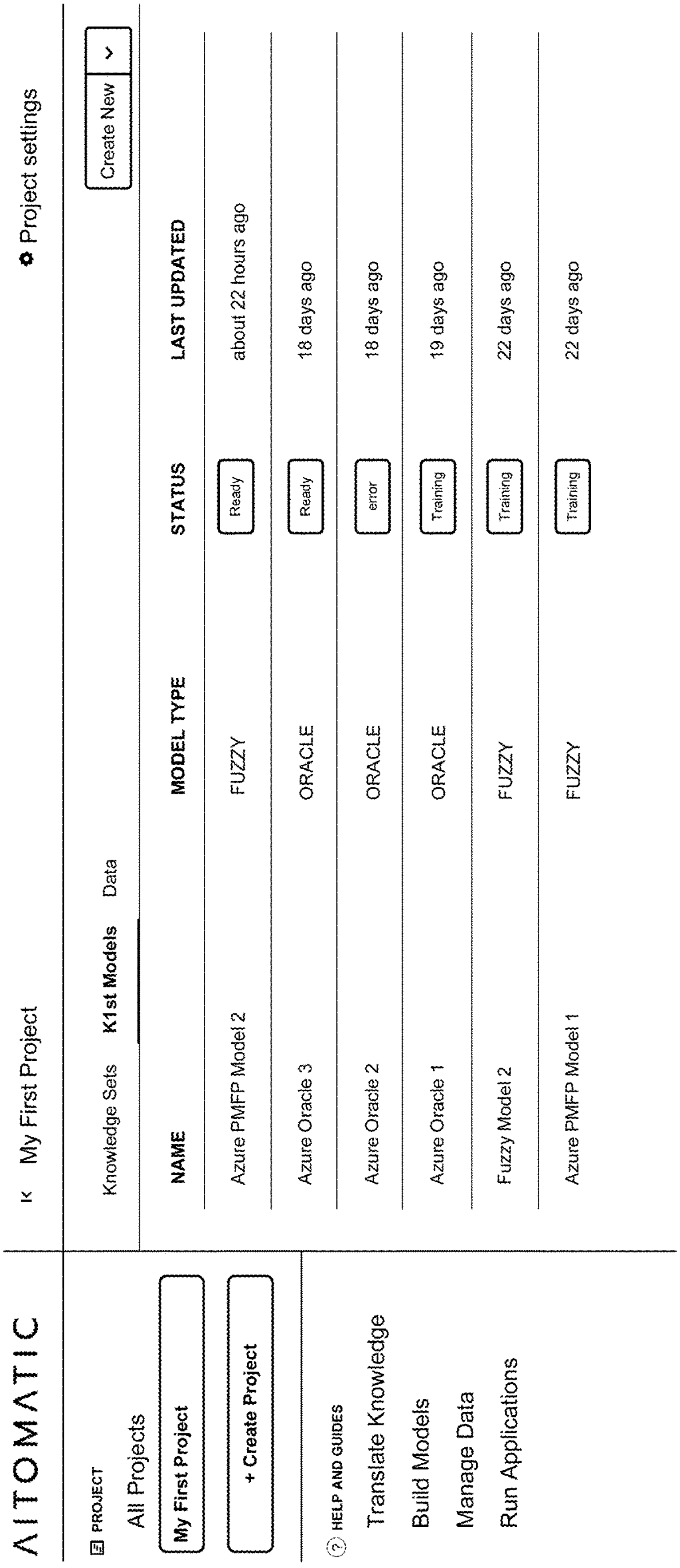

FIG. 13G shows a screenshot of the user interface for displaying details of a particular model.

Figure 13H:
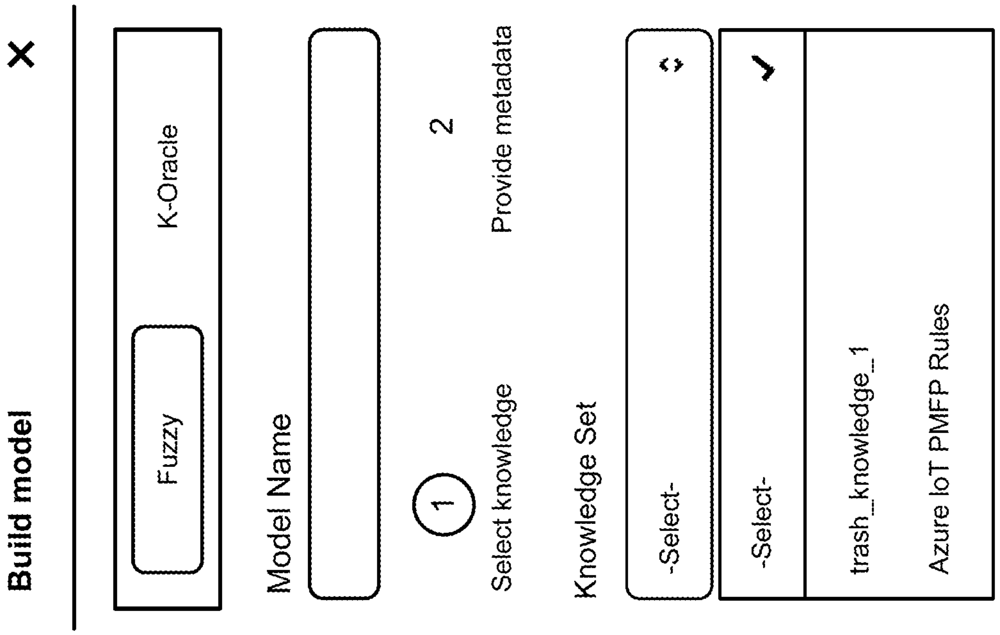

FIG. 13H shows a screenshot of the user interface for building a fuzzy model.

Figure 13I:
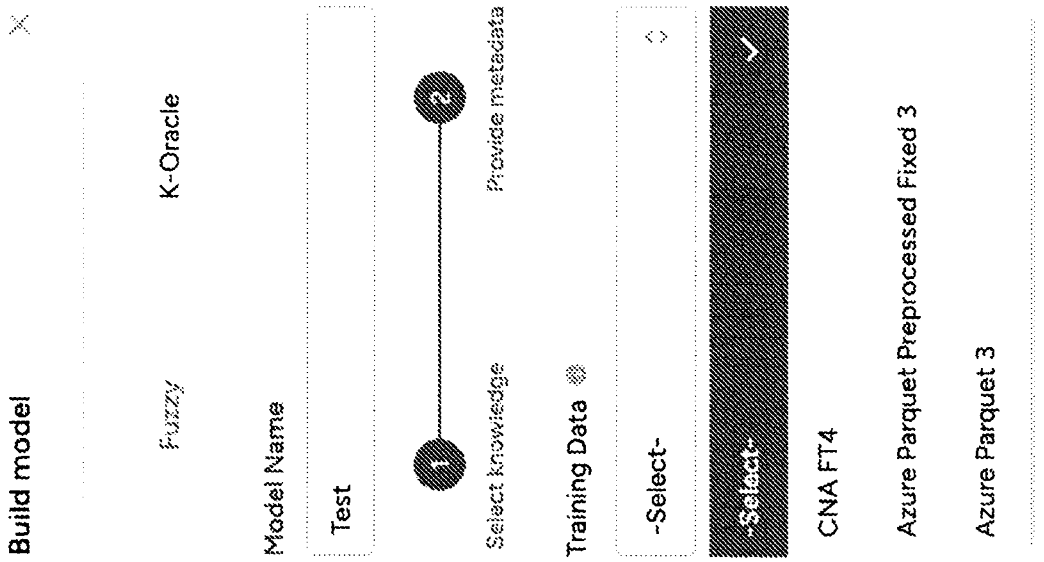

FIG. 13I shows a screenshot of the user interface for building a K-oracle model.

Figure 13J:
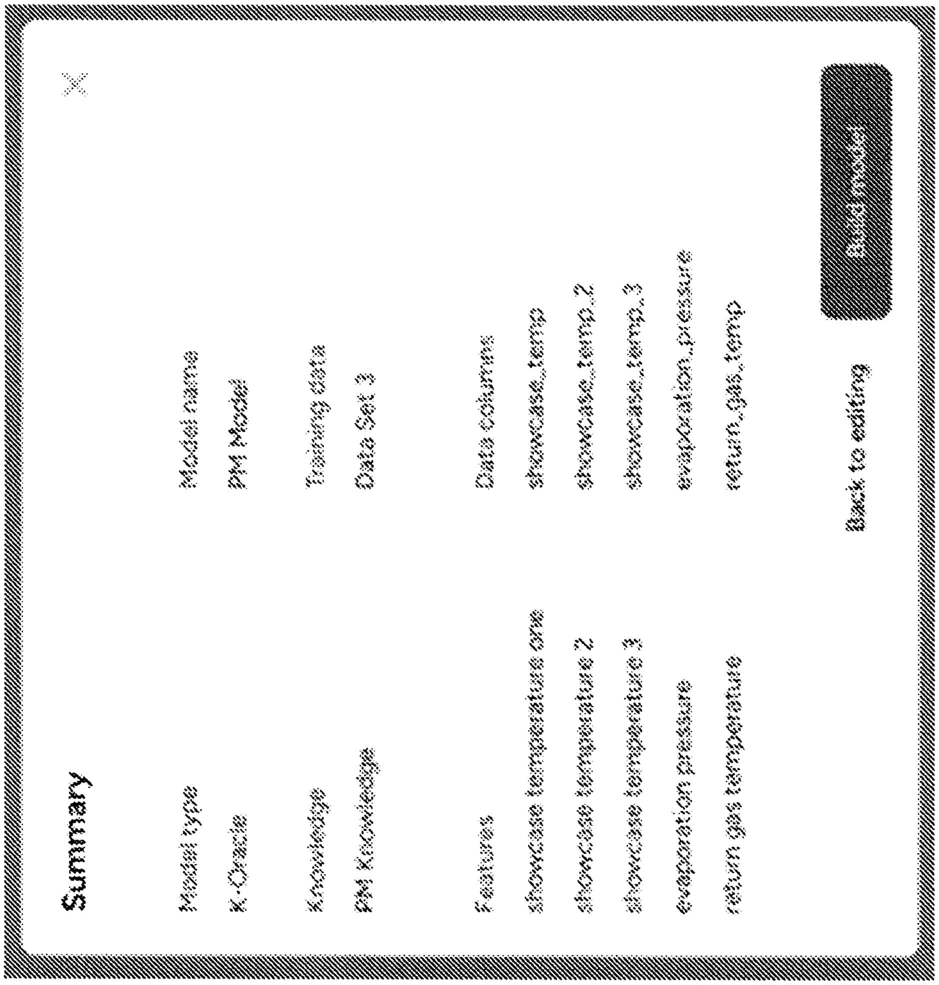

FIG. 13J shows a screenshot of the user interface showing details of a particular model.

Figure 13K:
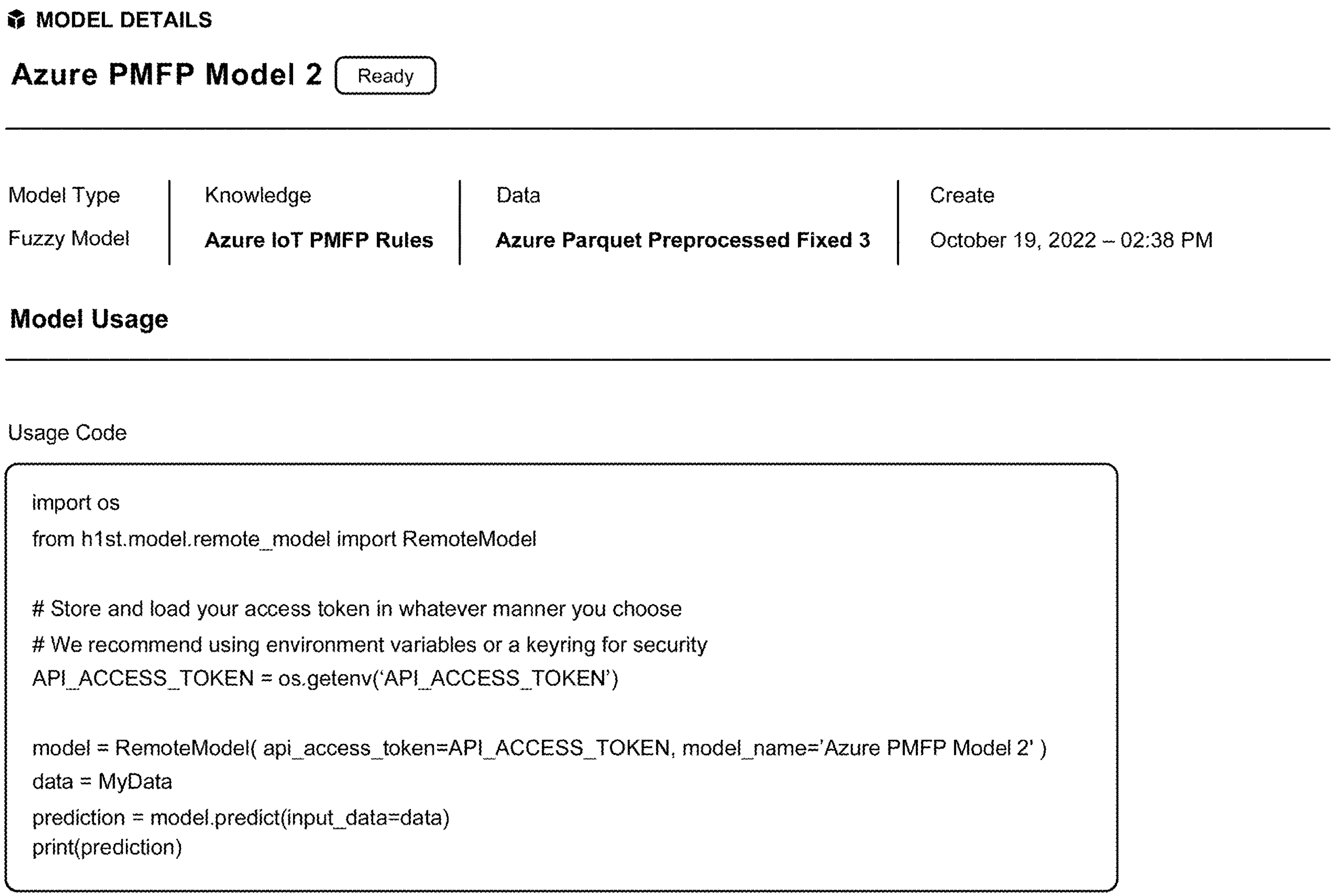

FIG. 13K shows a screenshot of the user interface showing details of usage of a model.

Figure 14:
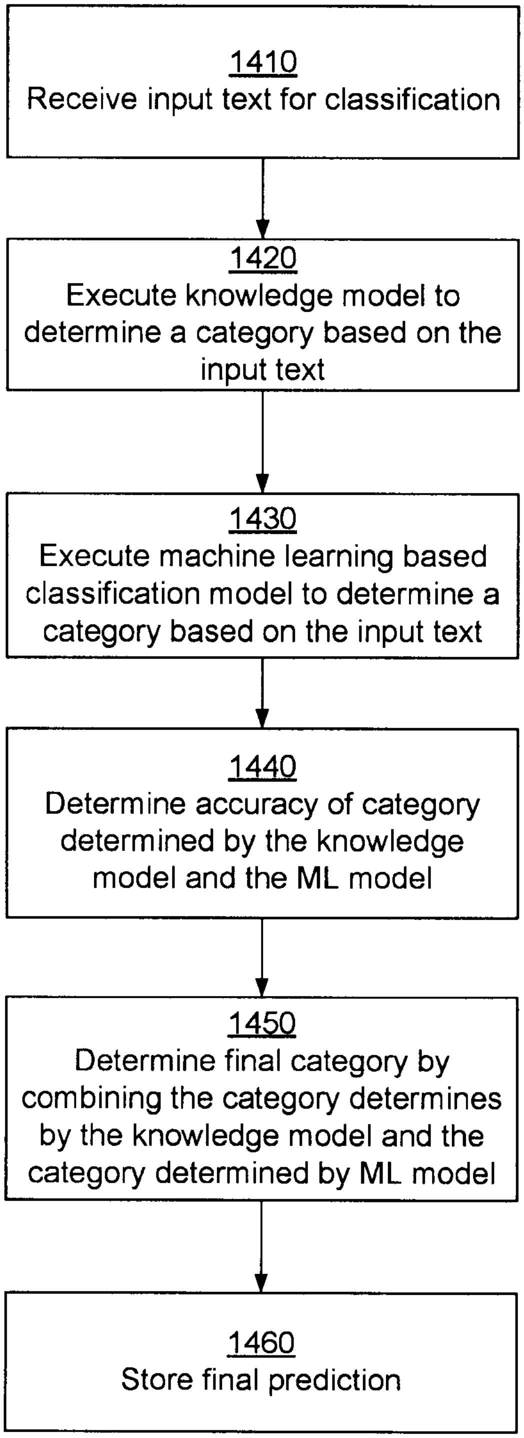
FIG. 14 illustrates the process for classifying test, according to an embodiment of the invention.
Figure 15:
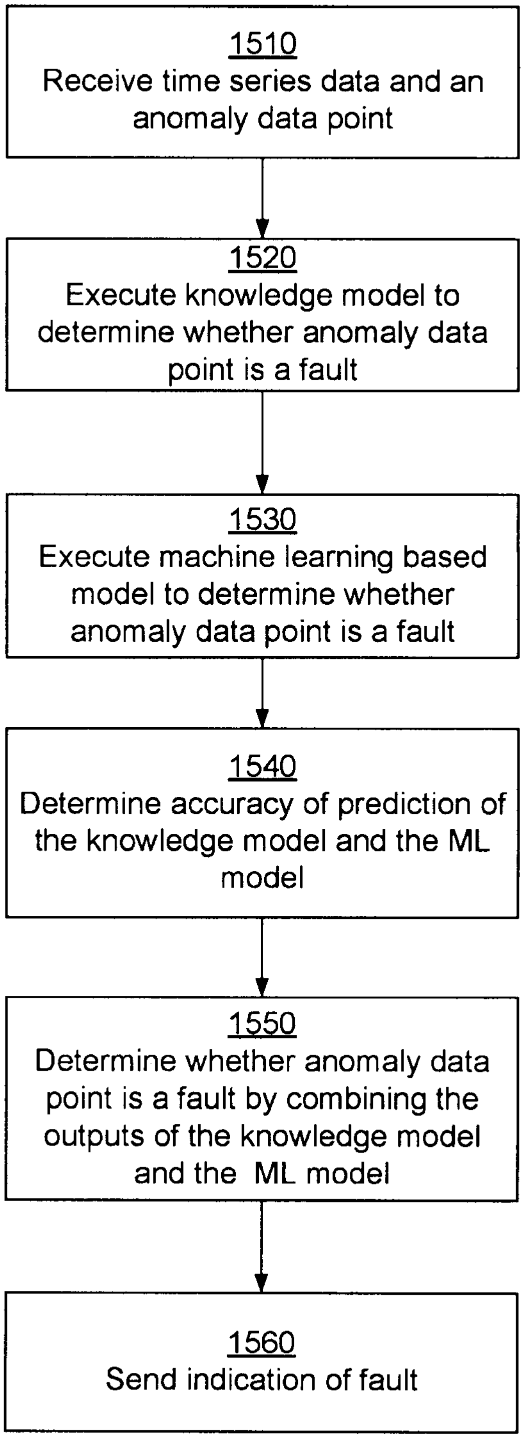
FIG. 15 illustrates the process for detecting faults in time series data, according to an embodiment of the invention.

The knowledge first architecture can be applied to various applications. These include text classification, fault detection in time series data, and various applications in industrial processes. Some of the processes are illustrated in FIGS. 14-15 and described in connection with these figures. However, the techniques can be applied to other applications.

Applications: Classification

FIG. 14 illustrates the process for classifying test, according to an embodiment of the invention. The steps are described as being executed by a system, for example, the knowledge first system 120. The steps may be executed in an order different from that indicated herein, for example, some of the steps may be executed in parallel.

The system receives 1410 an input text for classification. The input text may represent articles retrieved from a website. The classification may map the text to a category selected from a hierarchy of categories. Although the process is described in connection with classification of text, the process can be used for classifying any type of input including images, videos, audio signals, and so on.

The system provides the input text to the knowledge model 210. The knowledge model 210 is a rule-based model comprising rules for classifying input data such as text. The system further provides the input text to a generalized model 220, for example, a machine learning based model trained for classifying input data such as text.

The system executes 1430 the knowledge model to generate a first output representing a first category for the input. The system executes 1440 the machine learning based model to generate a second output representing a second category for the input text. The system may determine a measure of accuracy of the category determined by the knowledge model and the ML model.

The system provides the first output and the second output to an ensemble model configured to combine results of the knowledge model and the machine learning based model. The system executes the ensemble model to determine 1450 a final category for the input text based on the first category determined by the knowledge model and the second category determined by the ML model.

The system sends 1460 the final category for the input text determined by the ensemble model to a client device. The final category may be used for taking any kind of action, for example, for redirecting messages based on the category of input text.

Applications: Fault Detection in Time Series Data

FIG. 15 illustrates the process for detecting faults in time series data, according to an embodiment of the invention. The steps are described as being executed by a system, for example, the knowledge first system 120. The steps may be executed in an order different from that indicated herein, for example, some of the steps may be executed in parallel.

The system receives 1510 time series data comprising a sequence of data points. Each data point is associated with a time value. The time series data may represent sensor data received from sensors. The system identifies a data point of the time series data that represents an anomaly. The data point may be referred to herein as an anomaly data point. The system may determine that a data point is an anomaly by executing a variational autoencoder.

The system provides information describing the data point representing the anomaly to a knowledge model. The knowledge model is a rule-based model that includes rules for determining whether an anomaly data pint represents a fault. For example, experts may determine based on various criteria whether the anomaly data point is a fault, and these criteria may be coded as rules of the knowledge model. The system provides information describing the data point representing the anomaly to a machine learning based model. The system executes 1520 the knowledge model to generate a first output indicating whether the data point represents a fault. The system executes 1530 the machine learning based model to generate a second output indicating whether the data point represents a fault.

The system may determine 1540 a measure of accuracy of prediction for each of the knowledge model and the ML model. The system provides the first output and the second output to an ensemble model configured to combine results of the knowledge model and the machine learning based model. The system executes the ensemble model to determine 1550 a final output based on a combination of the first output and the second output, the final output indicating whether the data point represents a fault. The system sends 1560 the final output, for example, to a client device fort display or as an alert to an operator of an industrial equipment.

According to an embodiment, the knowledge model is extended as new type of input is encountered. The system receives a new set of inputs, for example, new set of time series data generated by a particular sensor or equipment or new set of texts or images for classifying. The system determines that the machine learning based model has low accuracy of classification for inputs from the new set of inputs. Alternatively, the system may analyze the accuracy of the predictions for different input datasets and identify a particular input dataset that has low measure of accuracy. The system may send a message may to users such as experts identifying the low accuracy of the input dataset. The system receives additional rules for the knowledge model that apply to the new set of data received. The system adds one or more rules to the knowledge model for processing the new set of inputs, for example, the new rules may classify text in the new set or detect faults in a set of time series data.

The ensemble model determines the final output from the predictions made by the knowledge model for input from the new set of data. For example, the ensemble model may determine the category of an input text from the new set of text inputs if the accuracy of classification of the machine learning based model for the input text from the new set of text inputs is below a threshold value. Similarly, the ensemble model may determine whether an anomaly data point from the new set of inputs is a fault if the accuracy of fault detection for the input anomaly data point selected from the new set of time series data is below a threshold value.

The system uses the input from the new set of inputs and the prediction determined for the input by the ensemble model as training data for training the machine learning based model.

The system may generate synthetic data based on the input data from the new set of inputs and the predictions determined for the input by the ensemble model as additional training data for the machine learning based model.

According to an embodiment, the system receives a measure m1 of accuracy of the output generated by the knowledge model and a measure m2 of accuracy of the output generated by the machine learning based model and determines the prediction for the input based on the outputs of the knowledge model and the ML model based on at least one of measure m1 of accuracy or measure m2 of accuracy.

The system may select the output of the model that has higher accuracy. For example, the ensemble model uses output of the knowledge model if the knowledge model has higher accuracy compared to the machine learning based model.

Computer Architecture

Figure 16:
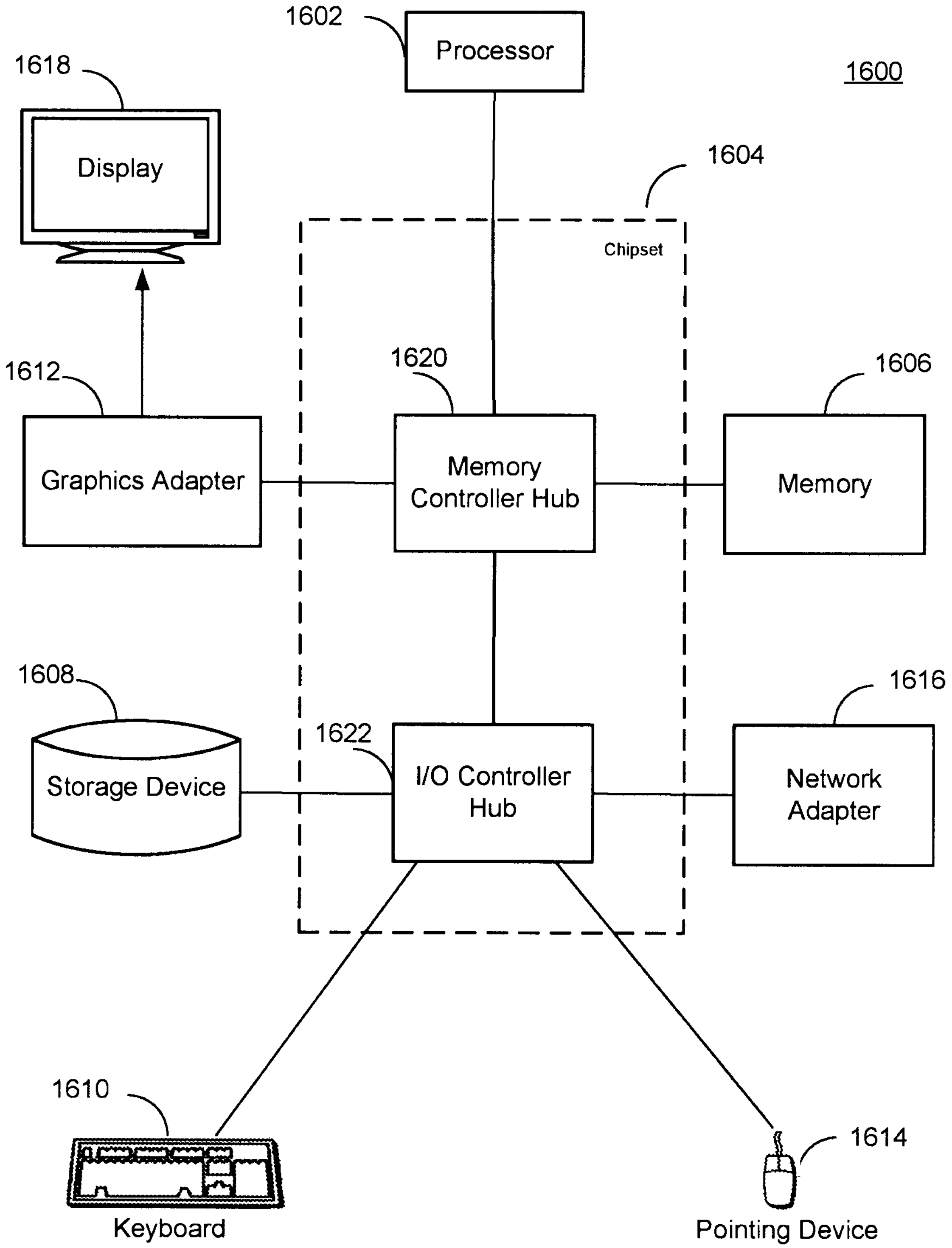
FIG. 16 is a high-level block diagram illustrating an example of a computer system in accordance with an embodiment.

FIG. 16 is a high-level block diagram illustrating an example system, in accordance with an embodiment. The computer 1600 includes at least one processor 1602 coupled to a chipset 1604. The chipset 1604 includes a memory controller hub 1620 and an input/output (I/O) controller hub 1622. A memory 1606 and a graphics adapter 1612 are coupled to the memory controller hub 1620, and a display 1618 is coupled to the graphics adapter 1612. A storage device 1608, keyboard 1610, pointing device 1614, and network adapter 1616 are coupled to the I/O controller hub 1622. Other embodiments of the computer 1600 have different architectures.

The storage device 1608 is a non-transitory computer-readable storage medium such as a hard drive, compact disk read-only memory (CD-ROM), DVD, or a solid-state memory device. The memory 1606 holds instructions and data used by the processor 1602. The pointing device 1614 is a mouse, track ball, or other type of pointing device, and is used in combination with the keyboard 1610 to input data into the computer system 1600. The graphics adapter 1612 displays images and other information on the display 1618. The network adapter 1616 couples the computer system 1600 to one or more computer networks.

The computer 1600 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 1608, loaded into the memory 1606, and executed by the processor 1602. The types of computers 1600 used can vary depending upon the embodiment and requirements. For example, a computer may lack displays, keyboards, and/or other devices shown in FIG. 16.

Additional Considerations

The disclosed embodiments increase the efficiency of storage of time series data and also the efficiency of computation of the time series data. The neural network helps convert arbitrary size sequences of data into fixed size feature vectors. In particular the input sequence data (or time series data) can be significantly larger than the feature vector representation generated by the hidden layer of neural network. For example, an input time series may comprise several thousand elements whereas the feature vector representation of the sequence data may comprise a few hundred elements. Accordingly, large sequences of data are converted into fixed size and significantly small feature vectors. This provides for efficient storage representation of the sequence data. The storage representation may be for secondary storage, for example, efficient storage on disk or for or used for in-memory processing. For example, for processing the sequence data, a system with a given memory can process a large number of feature vector representations of sequences (as compared to the raw sequence data). Since large number of sequences can be loaded at the same time in memory, the processing of the sequences is more efficient since data does not have to be written to secondary storage often.

Furthermore, the process of clustering sequences of data is significantly more efficient when performed based on the feature vector representation of the sequences as compared to processing of the sequence data itself. This is so because the number of elements in the sequence data can be significantly higher than the number of elements in the feature vector representation of a sequence. Accordingly, a comparison of raw data of two sequences requires significantly more computations than comparison of two feature vector representations. Furthermore, since each sequence can be of different size, comparison of data of two sequences would require additional processing to extract individual features.

Embodiments can performs processing of the neural network in parallel, for example using a parallel/distributed architecture. For example, computation of each node of the neural network can be performed in parallel followed by a step of communication of data between nodes. Parallel processing of the neural networks provides additional efficiency of computation of the overall process described herein, for example, in FIG. 4.

It is to be understood that the Figures and descriptions of the present invention have been simplified to illustrate elements that are relevant for a clear understanding of the present invention, while eliminating, for the purpose of clarity, many other elements found in a typical distributed system. Those of ordinary skill in the art may recognize that other elements and/or steps are desirable and/or required in implementing the embodiments. However, because such elements and steps are well known in the art, and because they do not facilitate a better understanding of the embodiments, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for displaying charts using a distortion region through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for fault detection comprising:

receiving time series data comprising a sequence of data points each data point associated with a time value;

identifying a data point of the time series data that represents an anomaly;

providing information describing the data point representing the anomaly to a knowledge model, wherein the knowledge model is a rule-based model;

providing information describing the data point representing the anomaly to a machine learning based model;

executing the knowledge model to generate a first output indicating whether the data point represents a fault;

executing the machine learning based model to generate a second output indicating whether the data point represents a fault;

providing the first output and the second output to an ensemble model configured to combine results of the knowledge model and the machine learning based model;

executing the ensemble model to determine a final output based on a combination of the first output and the second output, the final output indicating whether the data point represents a fault, wherein the ensemble model uses the first output of the knowledge model as the final output if a measure of accuracy of the machine learning based model is below a predetermined threshold value; and sending the final output.

2. The computer-implemented method of claim 1, wherein the time series data represents sensor data collected from sensors.

3. The computer-implemented method of claim 1, wherein identifying the data point of the time series data that represents the anomaly is performed by executing a variational autoencoder.

4. The computer-implemented method of claim 1, wherein determining the final output by the ensemble model comprises:

receiving a first measure of accuracy of the first output generated by the knowledge model;

receiving a second measure of accuracy of the second output generated by the machine learning based model; and determining the final output based on the combination of the first output and the second output based on at least one of the first measure of accuracy or the second measure of accuracy.

5. The computer-implemented method of claim 1, wherein the final output is a weighted aggregate of the first output and the second output, wherein a weight of each of the first output and the second output is determined based on a measure of accuracy of corresponding output.

6. The computer-implemented method of claim 1, wherein determining the final output by the ensemble model comprises:

responsive to determining the final output based on the first output of the knowledge model, using the final output for training of the machine learning based model.

7. The computer-implemented method of claim 6, further comprising:

generating synthetic data as additional training data for the machine learning based model using the final output.

8. A non-transitory computer readable storage medium storing instructions that when executed by one or more computer processors, cause the one or more computer processors to perform steps comprising:

receiving time series data comprising a sequence of data points each data point associated with a time value;

identifying a data point of the time series data that represents an anomaly;

providing information describing the data point representing the anomaly to a knowledge model, wherein the knowledge model is a rule-based model;

providing information describing the data point representing the anomaly to a machine learning based model;

executing the knowledge model to generate a first output indicating whether the data point represents a fault;

executing the machine learning based model to generate a second output indicating whether the data point represents a fault;

providing the first output and the second output to an ensemble model configured to combine results of the knowledge model and the machine learning based model;

executing the ensemble model to determine a final output based on a combination of the first output and the second output, the final output indicating whether the data point represents a fault, wherein the ensemble model uses the first output of the knowledge model as the final output if a measure of accuracy of the machine learning based model is below a predetermined threshold value; and sending the final output.

9. The non-transitory computer readable storage medium of claim 8, wherein the time series data represents sensor data collected from sensors.

10. The non-transitory computer readable storage medium of claim 8, wherein identifying the data point of the time series data that represents the anomaly is performed by executing a variational autoencoder.

11. The non-transitory computer readable storage medium of claim 8, wherein determining the final output by the ensemble model causes the one or more computer processors to perform steps comprising:

receiving a first measure of accuracy of the first output generated by the knowledge model;

receiving a second measure of accuracy of the second output generated by the machine learning based model; and determining the final output based on the combination of the first output and the second output based on at least one of the first measure of accuracy or the second measure of accuracy.

12. The non-transitory computer readable storage medium of claim 8, wherein the final output is a weighted aggregate of the first output and the second output, wherein a weight of each of the first output and the second output is determined based on a measure of accuracy of corresponding output.

13. The non-transitory computer readable storage medium of claim 8, wherein determining the final output by the ensemble model causes the one or more computer processors to perform steps comprising:

responsive to determining the final output based on the first output of the knowledge model, using the final output for training of the machine learning based model.

14. The non-transitory computer readable storage medium of claim 13, wherein the instructions further cause the one or more computer processors to perform steps comprising:

generating synthetic data as additional training data for the machine learning based model using the final output.

15. A computer system comprising:

one or more computer processors; and a non-transitory computer readable storage medium storing instructions that when executed by the one or more computer processors, cause the one or more computer processors to perform steps comprising:

receiving time series data comprising a sequence of data points each data point associated with a time value;

identifying a data point of the time series data that represents an anomaly;

providing information describing the data point representing the anomaly to a knowledge model, wherein the knowledge model is a rule-based model;

providing information describing the data point representing the anomaly to a machine learning based model;

executing the knowledge model to generate a first output indicating whether the data point represents a fault;

executing the machine learning based model to generate a second output indicating whether the data point represents a fault;

providing the first output and the second output to an ensemble model configured to combine results of the knowledge model and the machine learning based model;

executing the ensemble model to determine a final output based on a combination of the first output and the second output, the final output indicating whether the data point represents a fault, wherein the ensemble model uses the first output of the knowledge model as the final output if a measure of accuracy of the machine learning based model is below a predetermined threshold value; and sending the final output.

16. The computer system of claim 15, wherein the time series data represents sensor data collected from sensors.

17. The computer system of claim 15, wherein identifying the data point of the time series data that represents the anomaly is performed by executing a variational autoencoder.

18. The computer system of claim 15, wherein determining the final output by the ensemble model causes the one or more computer processors to perform steps comprising:

receiving a first measure of accuracy of the first output generated by the knowledge model;

receiving a second measure of accuracy of the second output generated by the machine learning based model; and determining the final output based on the combination of the first output and the second output based on at least one of the first measure of accuracy or the second measure of accuracy.

19. The computer system of claim 15, wherein determining the final output by the ensemble model causes the one or more computer processors to perform steps comprising:

responsive to determining the final output based on the first output of the knowledge model, using the final output for training of the machine learning based model.

20. The computer system of claim 19, wherein the instructions further cause the one or more computer processors to perform steps comprising:

generating synthetic data as additional training data for the machine learning based model using the final output.

* * * * *